(12) United States Patent
del Rio Herrero et al.

(10) Patent No.: US 7,990,874 B2
(45) Date of Patent: Aug. 2, 2011

(54) METHODS, APPARATUSES AND SYSTEM FOR ASYNCHRONOUS SPREAD-SPECTRUM COMMUNICATION

(75) Inventors: Oscar del Rio Herrero, Leiden (NL); Riccardo De Gaudenzi, Den Haag (NL)

(73) Assignee: Agence Spatiale Europeenne, Paris (FR)

( * ) Notice: Subject to any disclaimer, the term of this patent is extended or adjusted under 35 U.S.C. 154(b) by 162 days.

(21) Appl. No.: 12/547,092

(22) Filed: Aug. 25, 2009

(65) Prior Publication Data

US 2010/0054131 A1 Mar. 4, 2010

(30) Foreign Application Priority Data

Aug. 26, 2008 (EP) .................................... 08290801

(51) Int. Cl.
*H04L 12/26* (2006.01)
(52) U.S. Cl. ........................................ 370/236; 370/517
(58) Field of Classification Search .................. 370/517, 370/537, 487, 486, 347, 522
See application file for complete search history.

(56) References Cited

U.S. PATENT DOCUMENTS

| | | | | |
|---|---|---|---|---|
| 5,559,808 | A | * | 9/1996 | Kostreski et al. ............. 370/517 |
| 5,666,365 | A | * | 9/1997 | Kostreski ....................... 370/486 |
| 5,729,549 | A | * | 3/1998 | Kostreski et al. ............. 370/522 |
| 5,748,683 | A | * | 5/1998 | Smith et al. ................... 375/347 |
| 5,809,059 | A | | 9/1998 | Souissi et al. |
| 5,822,324 | A | * | 10/1998 | Kostresti et al. ............. 370/487 |
| 5,852,612 | A | * | 12/1998 | Kostreski et al. ............. 370/537 |

FOREIGN PATENT DOCUMENTS

| | | |
|---|---|---|
| EP | 1 686 746 | 8/2006 |
| GB | 2 406 479 | 3/2005 |
| WO | WO 99/39445 | 8/1999 |
| WO | WO 02/33838 | 4/2002 |
| WO | WO 2007/051111 | 5/2007 |

OTHER PUBLICATIONS

International Search Report from European Application No. 08290801.3, filed Aug. 26, 2008.
Tadokoro Y et al.: "A new packet detection scheme in CDMA unslotted ALOHA system with successive interference cancellation"; GLOBECOM'01. 2001 IEEE Global Telecommunications Conference; San Antonio, TX; Nov. 25-29, 2001; New York, NY; IEEE, US; vol. 5, pp. 3173-3177; XP010747526.

(Continued)

*Primary Examiner* — Thong Vu
(74) *Attorney, Agent, or Firm* — Alston & Bird LLP

(57) ABSTRACT

A method of receiving data packets asynchronously transmitted by a plurality of user terminals using a spread-spectrum medium access protocol, comprises a step of cancelling interferences between colliding packets according to an innovative "sliding window" processing algorithm. A gateway receiver is adapted for carrying out interference cancellation using this algorithm. Asynchronous packet transmission from a user terminal is controlled by estimating a parameter indicative of the quality of information transmission through a communication channel; and inhibiting or allowing data transmission depending on a comparison between said estimated parameter and an adaptively varying threshold. A user terminal comprises transmission control means adapted for carrying out such a method. A communication system comprises a plurality of mobile user terminal communicating with a gateway through a satellite channel using an asynchronous spread-spectrum medium access protocol without closed-loop power control, wherein the user terminals and said gateway are of the kind described above.

22 Claims, 18 Drawing Sheets

OTHER PUBLICATIONS

Enrico Casini et al: "Contention Resolution Diversity Slotted ALOHA (CRDSA): An Enhanced Random Access Schemefor Satellite Access Packet Networks"; IEEE Transactions on Wireless Communications, IEEE Service Center, Piscataway, NJ, US; vol. 6, No. 4; Apr. 1, 2007; pp. 1408-1419; XP011177132.

Markku J Juntti et al.: "Finite Memory-Length Linear Multiuser Detection for Asynchronous CDMA Communications"; IEEE Transactions on Communications, IEEE Service Center, Piscataway, NJ, US; vol. 45, No. 5; May 1, 1997; XP011008937.

Wijayasuriya H et al.: "A Sliding Window Decorrelating Receiver for Multiuser DS-CDMA Mobile Radio Networks"; IEEE Transactions on Vehicular Technology, IEEE Service Center, Piscataway, NJ, US; vol. 45, No. 3; Aug. 1, 1996; XP011063519.

* cited by examiner

METHODS, APPARATUSES AND SYSTEM FOR ASYNCHRONOUS SPREAD-SPECTRUM COMMUNICATION

CROSS-REFERENCE TO RELATED APPLICATIONS

This application claims priority from European Application No. 08290801.3, filed Aug. 26, 2008, which is hereby incorporated herein in its entirety by reference.

FIELD AND BACKGROUND OF THE INVENTION

The invention relates to methods, to apparatuses and to a system for asynchronous spread-spectrum communication over a shared channel.

In particular, the invention applies to the field of satellite communication between mobile user terminals and one or more gateway through a satellite link.

In the near future satellite communications, in particular in the S-band, are expected to be used in settings other than the baseline one-way scenario. In particular, a new range of applications can take advantage of the S-band assigned to Earth-to-space communications in addition to the space-to-earth direction. This implies implementation of a two-way communications protocol, fully integrating the one-way broadcast protocol, and the development of a new system architecture, and of the related subsystems.

In any case, future applications will be aimed at mobile terminal use, taking advantage of the possibility of implementing small antennas in S-band. This implies that such two-way applications would take advantage of the integration with positioning systems (GPS/Galileo) enabling location-based information and services to the users. The design of a simple and low-cost yet high performance mobile satellite messaging return link represents a technical challenge.

A communication system according to the invention aims at providing broadcast-enabled integrated two-way communications, compatible with the IP protocol and leveraging as much as possible existing communications and broadcast standards, for the provision of non real-time messaging services from and/or to a large set of terminals (of the order of millions).

The invention is mainly directed to non-real-time messaging (data collection or short text messaging). In such an application, individual messages have a typical length of a few hundreds of bytes, and a low bit rate (e.g. a few kbps). The delivery delay should be from a few seconds to a few minutes (even more if the terminal is not in visibility of the satellite). The activity factor is estimated in a few tens of Kbytes per user per day (e.g. 100 messages of 100 bytes=10 KB), i.e. a very low one.

Such a low duty-cycle makes efficient implementation of the return link (or uplink) challenging, because:
- closed loops for timing synchronization, power control, access control (Demand Assignment Multiple Access—DAMA), etc. . . . cannot work properly;
- slotted random access solutions such as Slotted-Aloha or the more recently proposed Contention Resolution Diversity Slotted Aloha (CRDSA)—see document EP1686746—should also be avoided as they would require an unacceptable signaling overhead.

Slotted Aloha (SA) protocols are used in TDMA (Time Division Multiple Access) systems with low efficiency and reliability. The MAC (Medium Access Control) layer throughput is pretty poor for SA (Throughput $T=10^{-3}$ b/s/Hz for a packet loss ratio—PLR—of $10^{-3}$). Higher throughput may be achieved relaxing the PLR requirement and thus calling for packet retransmissions. Terminal burst synchronization is very inefficient for large number of terminal with (very) low transmission duty cycle like it is the case in the envisaged applications. In fact, burst slot synchronization requires an unacceptable signaling overhead in both the forward and return links. Finally, for SA the terminal EIRP (Effective Isotropically Radiated Power) requirement is related to the aggregated data rate of the TDMA multiple access scheme, rather than to the single terminal bit rate, and this penalizes low-cost terminal solutions.

Slotted Aloha protocols are described e.g. by "ALOHA Packet Systems with and Without Slots and Capture", ARPANET System Note 8 (NIC11290), June 1972.

The paper by G. L. Choudhury and S. S. Rappaport, "Diversity ALOHA—A Random Access Scheme for Satellite Communications", IEEE Trans. on Comm. Vol. COM-31, No. 3, March 1983, pp. 450-457 describes an enhanced version of Aloha known as Diversity Slotted Aloha (DSA). Document EP1686746 and the paper by E. Casini, R. De Gaudenzi, O. del Rio Herrero, "Contention Resolution Diversity Slotted ALOHA (CRDSA): An Enhanced Random Access Scheme for Satellite Access Packet Networks", IEEE Trans. on Wireless Comm., Vol. 6, No. 4, April 2007, pp. 1408-1417 describe a further improvement of the Aloha protocol, known as Contention Resolution Diversity Slotted Aloha (CRDSA). CRDSA allows increasing the MAC throughput by an order of magnitude with respect to standard SA without degrading the PLR.

Spread Spectrum Aloha (SSA), also called Spread Aloha, is an alternative random access protocol described in the paper by O. del Rio Herrero, G. Foti, and G. Gallinaro, "Spread-spectrum techniques for the provision of packet access on the reverse link of next-generation broadband multimedia satellite systems", IEEE Journal on Sel. Areas in Comm., vol. 22, no. 3, pp. 574-583, April 2004. SSA shows potentially interesting features as it provides a higher throughput capability than SA or CRDSA for the same PLR target under equal power multiple access conditions and using powerful physical layer FEC (Forward Error Correction), i.e. of the order of G=0.45 b/s/Hz for a packet loss ratio of $10^{-3}$). Furthermore SSA allows operating in a truly asynchronous mode. Spread Aloha terminal EIRP is in principle linked to the single user data rate although extra power is required to combat the CDMA self-noise. Also from this point SSA of view provides advantages compared to SA.

However, the main drawback of SSA is its high sensitivity to multiple access carrier power unbalance, disrupting the throughput of the scheme (e.g. a lognormal carrier power standard deviation of 3 dB can diminish the throughput by several orders of magnitude).

The basic principle of the Spread-Aloha scheme is the following: when a satellite terminal has a packet to transmit, it picks up at random one spreading sequence among a predetermined set of sequences, and one possible spreading code phase, and transmits it. The transmit burst spreading sequence code timing randomization is particularly important in slotted spread Aloha and requires a significantly higher number of spreading sequences compared to unslotted spread Aloha to achieve similar performances. The number of spreading sequences used in the system has a direct impact on the gateway burst demodulator complexity (i.e. on the number of correlators required).

An important feature of the SSA scheme is that the throughput grows linearly with the channel load until a breakdown point is reached. This behavior can be explained by the fact that the packets are successfully decoded until the multiple access channel signal-to-noise plus interference ratio (SNIR) at the gateway is above the physical layer threshold. When the SNIR becomes lower than a threshold values, the packets can not be recovered anymore and the throughput collapses. This behavior is verified if signals emitted by all the users arrive at the gateway burst demodulator with equal power; otherwise the actual system behavior will deviate from this simple model.

Document U.S. Pat. No. 5,537,397 describes a Spread Aloha scheme wherein multiple transmitters transmit data signals using identical spreading codes. A single matched filter of a receiver receives all the signals. A broadcast timing control signal retards or advances timings of individual transmitters to offset the interleaved signals. A subtracting circuit subtracts first and strongest signals until a single signal remains, and then reinserts the subtracted signals in the receiver. The identical code spreading sequence used in all the transmitters and in the matched filter is selected from a specific class of codes known as maximum length shift register sequences in a length equal to $2^n-1$ for integer values of n. The document mentions the possibility of using successive interference cancellation (SIC) to increase throughput, but no practical SIC solution for packet mode operation are proposed.

Document U.S. Pat. No. 5,745,485 describes a further improvement of a SSA scheme, comprising multiple-access signal detection by using a small number of different spreading signals. The spreading sequence is selected depending on a property of the signal being transmitted, rather than on the transmitter as in Code Division Multiple Access (CDMA). Multiple transmitters can use pilot signals and transmit the multiple data signal with the selected spreading sequences. A hub station receives the multiple data signals and detects the multiple data signals with matched filters or correlators matched to the code spreading sequences. Outputs of the matched filters or of the correlators can create control signals for offsetting the transmitted data signals by advancing or retarding the transmission time of the multiple data signals from the multiple transmitters.

Document U.S. Pat. No. 6,625,138 relates to a data transmission method used in a CDMA-type radio system. A base station and terminal equipments exchange data at least in a packet switched mode, and a terminal equipment transmits to the base station on a random access channel a random access signal comprising at least a preamble and a data part multiplied by a spreading code. A predetermined set of spreading codes and signature sequences are stored in the terminal equipment, and each signature sequence determines one spreading code. The terminal equipment selects one signature sequence by a random process from the set of signature sequences and adds the selected signature sequence to the preamble of the random access signal. Further, the terminal equipment uses the spreading code corresponding to the selected signature sequence in the data part of the random access signal. Interference cancellation is performed at the base station according to the signature sequence of the preamble of the received random access signal, such that at least the interference caused by the received data part is eliminated from at least one other received signal in order to improve detection. Like above-cited document U.S. Pat. No. 5,537, 397, this document fails disclosing practical solution for performing SIC with bursty transmission.

Document U.S. Pat. No. 7,065,125 describes a multiple access communication technique wherein a multitude of transmitters communicate with receivers using direct sequence spread spectrum signaling. The direct sequence codes are reused by a large number of simultaneous transmitters, so the system is named Code Reuse Multiple Access ("CRMA"). This reuse method requires only a small number of spreading codes relative to the number of simultaneous transmitters, and can use as few as one code for all the users. The direct sequence codes are not required to have special properties such as maximal length. The lengths of the spreading codes employed are not necessarily related to the bit or symbol interval. CRMA can be implemented on a Paired Carrier Multiple Access ("PCMA") system with or without a novel receiver structure which is also described by the document.

The paper from Xiang Feng, Yan Li, Guangguo Bi, "A CDMA-slotted ALOHA broadband system for multiservices", IEEE 1998 International Conference on Universal Personal Communications, ICUPC '98, Florence, Italy 5-9 Oct. 1998, Volume: 2, pp. 1131-1135, shows that CDMA can offer significant advantages in wireless environments, especially when large capacity and wide range of service rates must be supported. This paper proposes a CDMA-slotted ALOHA system, in which all transmitters use the same PN sequence but with different chip phases and packets can be captured and received because of the autocorrelation property of the PN sequence. Analysis and simulation results show that the maximum channel throughput of this system is much greater than conventional SA systems and multiple services can be supported with guaranteed QoS (Quality of Service).

The paper from Y. Tadokoro, H. Okada, T. Yamazato, A. Katayama, A. Ogawa, "A new packet detection scheme in CDMA unslotted ALOHA system with successive interference cancellation", IEEE Global Telecommunications Conference, 2001, GLOBECOM '1 Nov. 2001, San Antonio, Tex., USA, Volume: 5, pp. 3173-3177, outlines that packet detection is one of the most important problems in packet communication systems. In a CDMA Unslotted ALOHA system, multiple access interference (MAI) makes the performance of the packet detection worse. To reduce the effect of MAI, the authors propose a new packet detection scheme wherein Successive Interference Cancellation (SIC) is applied. The packet's signal is detected after the cancellation of MAI using SIC. This proposed scheme gives good performance of the packet detection. The paper is based on the very stringent assumption of ideal power control. Moreover, it is assumed that each user terminal uses a different, unique sequence.

In the papers from Schelegel et al.:

P. Kota, C. Schlegel, "A wireless packet multiple access method exploiting joint detection", IEEE International Conference on Communications, 2003, ICC '03, 11-15 May 2003 Volume: 4, pp. 2985-2989; and C. Schlegel, R. Kempter, P. Kota, "A novel random wireless packet multiple access method using CDMA", IEEE Transactions on Wireless Communications, June 2006 Volume: 5, Issue: 6, pp. 1362-1370;

a novel packet-based multiple access scheme for connectionless, uncoordinated random channel access is proposed. Random packet CDMA, or RP-CDMA, utilizes a novel packet format which consists of a short header and a data portion. Each header is spread with a unique spreading code which is identical for all users and packets, while the data portion of each packet is spread by a randomly chosen spreading sequence. The receiver operates in two stages: header detection and data detection. For header detection a conventional spread spectrum receiver is sufficient. Headers are spread with a large enough processing gain to allow detection even in severe interference. The data portion is decoded with a sophisticated receiver, such as a multiuser detector, which allows for successful decoding of overlapping active packets. It is shown that the RP-CDMA system is detector capability limited and that it can significantly outperform spread ALOHA systems whose performance is limited by the channel collision mechanism. RP-CDMA also experiences a much smaller packet retransmission rate than conventional or spread ALOHA, and provides better spectral efficiencies.

Throughput of random-access schemes of the "ALOHA" family are strongly dependent on the channel load. Therefore, it is known from prior art to implement an emission-control algorithm at the user terminal level in order to avoid channel congestion. See, for example, Simon S. Lam and Leonard Kleinrock, Packet-Switching in a Multi-Access Broadcast Channel: Dynamic Control Procedures, IEEE Trans. on Commun., Vol. COM-23, September 1975 and document US 2003/0133409.

Document WO 2007/051111 describes a method to mitigate the effect of multipath interference in a CDMA base station. This method comprises transmitting replicas of a given sub-packet which are repeated and soft combined until the information is correctly received at the base station. This approach can only be followed in a terrestrial system which benefits from fast base station feedbacks (acknowledged/not acknowledged) but it is not applicable at all to a satellite system.

Document WO 02/33838 discloses a receiving method comprising parallel interference cancellation. This method is based on fast user terminal to base station feedback which allows stopping packet retransmission when the packet has been successfully corrected. Therefore it is not applicable to satellite mobile networks due to the large propagation delay making the acknowledged/not acknowledged feedback too slow.

SUMMARY OF THE INVENTION

The invention aims at:
providing a way to very efficiently and reliably transmit in quasi real-time small size data packets with low duty cycle;
supporting a large user community of low-cost fixed and mobile terminals;
minimizing the associated signaling overhead; and
reusing as much as possible existing waveform standards for mass-market applications.

In particular, the proposed communication technique has high potential application at L/S-bands for:
vehicle telemetry services (road tax, insurance, road assistance);
data services;
mobile satellite two-way communication;
mobile broadband;
public safety and first-responder services;
issue of distress beacons in the event of an accident;
emergency alerting;
monitoring of traffic flows;
environmental monitoring
combination with GNSS applications;
location-aware services;
delivering of real time information on the road traffic;
automatic paying of highway or city toll.

The invention can also be carried out in the Ku/Ka-band, and for both fixed and mobile applications.

According to the invention, high capacity, reliable and low-cost random access system can be obtained by:
exploiting power unbalance for Successive Interference Cancellation (SIC) performance boosting; and/or
carrying out a specific demodulation/SIC processing at the gateway, optimizing SIC performances for burst mode operations while at the same time allowing gateway scalability and low cost implementation; and/or
adopting a smart open-loop packet transmission control scheme based on continuous downlink signal reception, reducing the transmit packet power unbalance and maximizing the transmission success rate; and/or
properly sizing the uplink link margin to make the residual packet error loss ratio below a wanted value.

The lack of uplink power control allows a simple implementation of the user terminals, moving processing complexity to the gateway.

A signaling system according to the invention has low overhead:
use if a Spread-Aloha scheme allows implementing a truly random access system, with no need for network/terminal synchronization, including slotted medium access control;
return link congestion can be avoided by exploiting a soft-busy tone signaling scheme;
a smart downlink acknowledgment scheme can reduce the forward link signaling overhead.

Moreover, the proposed solution can be easily implemented starting from current UMTS W-CDMA air interface, and the forward link can reuse existing mobile broadcasting standards such as DVB-SH with limited signaling overhead. Therefore the invention allows efficient reuse of existing commercial standards.

The method of the invention is simpler to implement than the above-cited RP-CDMA protocol, while allowing achieving a much higher spectral efficiency and a lower packet loss ratio.

According to claim 1, an object of the present invention is a method of receiving data packets asynchronously transmitted by a plurality of user terminals using an unslotted spread-spectrum medium access protocol, each data packet being constituted by a contiguous sequence of bits comprising at least a preamble and a payload, the method including a step of successive interference cancellation comprising:

a) storing received signal samples in a processing memory;

b) performing packet identification on all the signals stored in said processing memory within a sliding processing window;

c) selecting one among the identified packets, decoding it and, if decoding is successful, cancelling the interferences of said packet with the other received data inside the sliding processing window;

d) repeating step c) for all or part of the packets identified at step b); and e) shifting the processing window by a shifting step which is shorter than the overall length of said processing window.

Particular embodiments of such a method constitute the subject-matter of claims 2 to 9.

According to claim 10, another object of the present invention is a gateway receiver adapted for carrying out said method.

Still another object of the invention is a method of performing bi-directional asynchronous communication between a gateway receiver and a plurality of user terminals using an unslotted spread-spectrum medium access protocol, comprising a step of transmitting data packet from at least one said user terminal and a step of receiving transmitted data packet at said gateway receiver, characterized in that:

the step of receiving transmitted data packets is performed as described above; and the step of a transmitting data packets includes sub-step of controlling asynchronous packet transmission, comprising: estimating a parameter indicative of the quality of information transmission through the communication channel, on the basis of data emitted by said gateway and received by said user terminal through said channel; and inhibiting data transmission by said user terminal whenever said estimated parameter is indicative of an insufficient transmission quality, according to an adaptively varying criterion.

Such a method constitutes the subject-matter of claim 11, while claims 12 to 19 relates to particular embodiments thereof.

The step of transmitting data packets can also be performed on its own, in conjunction with a different packet receiving technique.

Still another object of the invention is a communication system according to claims 20 to 22.

BRIEF DESCRIPTION OF THE DRAWINGS

Additional features and advantages of the present invention will become apparent from the subsequent description, taken in conjunction with the accompanying drawings, which show:

FIGS. 9a and 9b, 3GPP turbo FEC simulated performances for two different information bit block sizes at the FEC input (100 and 1280 bits respectively).

MORE DETAILED DESCRIPTION

A random access scheme according to an embodiment of the invention is based on an "enhanced" spread Aloha scheme (E-SSA), exploiting interference cancellation techniques optimized for packet transmission mode. This scheme provides superior throughput compared to standard SA or SSA, and enhanced robustness to power unbalance at the gateway.

As discussed above, the idea of carrying out interference cancellation within a SSA scheme has already been disclosed in the prior art. However, there is a lack of practical SSA method to be implemented in a bursty spread-spectrum multi-user communication system of the kind considered here.

According to an embodiment of the invention, the received signal samples are stored at the gateway burst demodulator in a sliding memory. As incoming packets are successfully decoded at the gateway, their signal samples are regenerated and subtracted from the sliding memory (Successive Interference Cancellation or SIC). Implementing this mechanism at the gateway improves significantly the performances of the scheme, as the incoming packets experience a lower interference level at the burst demodulator. The scheme can be further enhanced by implementing an iterative receiver that processes the full sliding memory each time a new packet is successfully decoded and its interference removed.

Figure 1:
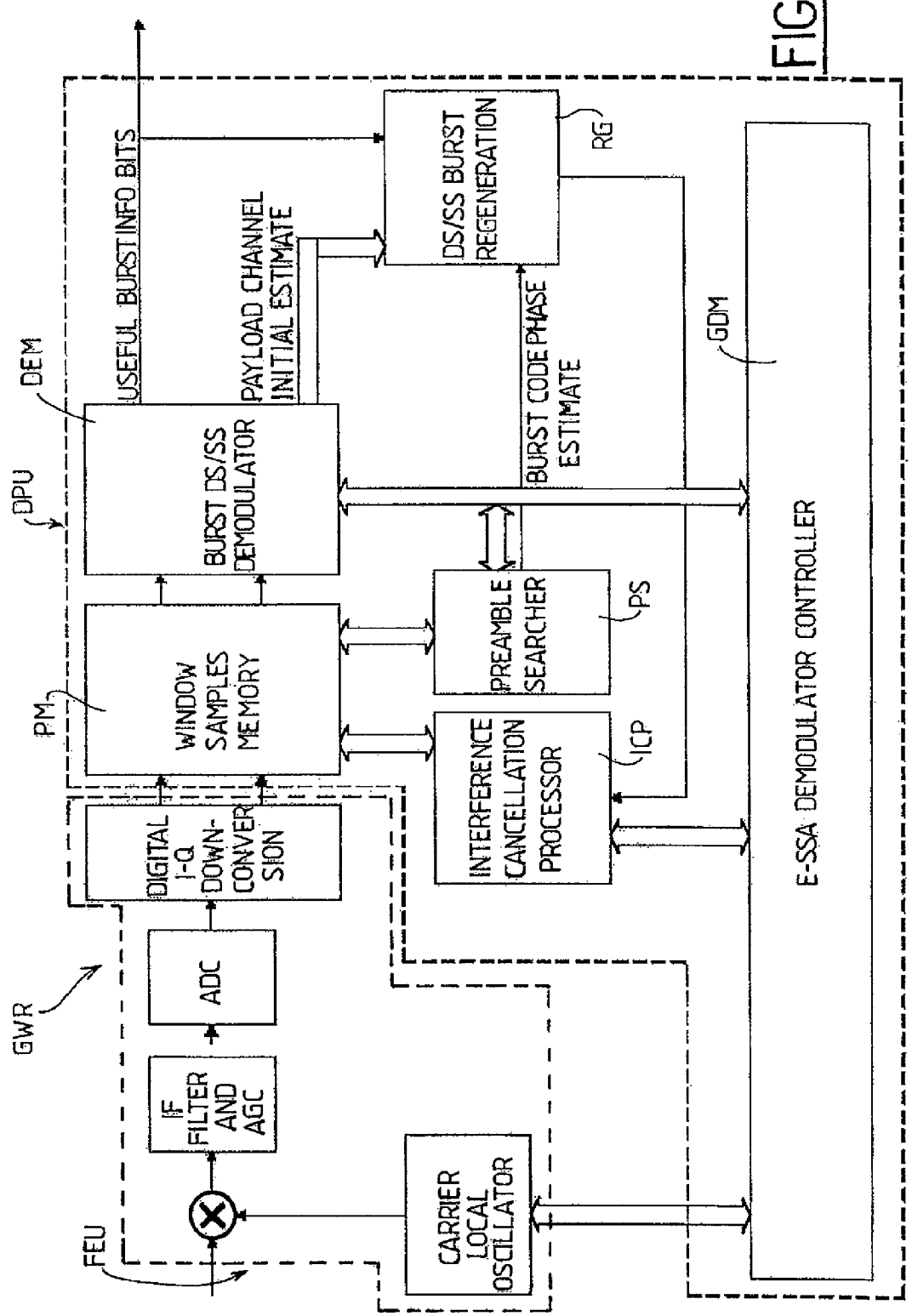
FIG. 1, a block diagram of a possible implementation of a gateway receiver according to an embodiment of the invention.
Figure 2:
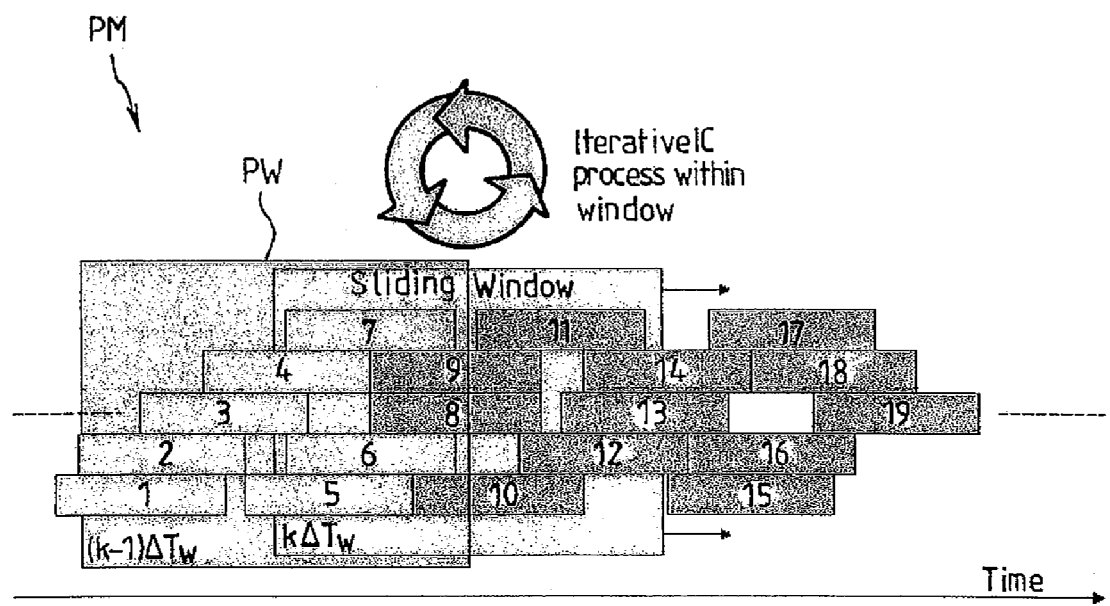
FIG. 2, the principle at the basis of a SIC process according to an embodiment of the invention.

A possible functional block diagram of the E-SSA demodulator at the gateway station is shown on FIG. 1. The intermediate frequency (IF) signal coming out from the gateway radio-frequency front-end unit FEU is band-pass filtered, converted in digital through IF sampling, digitally converted to baseband with I-Q components separation and stored in a digital processing memory PM. Among the data stored in this memory, those lying within a sliding processing window PW (see FIG. 2) will be processed at a time. The sliding processing window PW has a size of $2WN^S_{chip}$ real samples (it is assumed that I-Q samples are stored), wherein $N^S_{chip}$ corresponds to the number of chips per symbol and W corresponds to the window size in symbols for the packet reception and interference cancellation process. The window size W shall be optimized to be the smallest possible value yielding good performance. Typically W should be at least three times the physical layer packet length in symbols. The principle of the sliding window mechanism is illustrated in FIG. 2: SIC is performed on the signals stored in the processing memory PM and lying within the sliding processing window PW; then said signals are shifted by a shifting step $\Delta T_W$, which is shorter than the overall length of said sliding window (or, equivalently, the window is shifted while leaving the signals in place). As the shifting step $\Delta T_W$ is shorter than the overall length of the sliding memory, some already processed signals are kept within the window after the shift.

For example, FIG. 2 shows that data packets 1 to 7 and part of packets 8, 9 and 10 are processed during step (k-1). Then, the processing window is shifted: packets 1 and 2, and part of packets 3, 4 and 5, exit the window, while the missing parts of packets 8, 9 and 10, packet 11 and part of packets 12 to 14 enter it. Packets 6 and 7 will be processed at step (k-1). However, if they have not been successfully decoded in step (k-1) a new attempt will take place at step k. In the case where packets 6 and 7 have been successfully processed in step (k-1) and removed from the processing memory, then these packets are no longer processed in step k as they are no longer contained in the memory.

Typically, the shifting step $\Delta T_W$ has a length comprised between ⅓ and ½ of the overall window length.

It should be noted that received signal samples continue arriving during data processing; therefore already processed sample should be discarded. Typically, this will be realized by implementing the processing memory PM in the form of a sliding memory having a capacity equal to that of a full processing window (W) plus a shifting step $\Delta T_W$ (expressed in symbols).

At each window step, a packet reception and interference cancellation process is carried out. This process can be summarized as follows:

First of all, data packets are identified by preamble detection (preamble searcher PS on FIG. 1) and ranked by their SNIR.

The packets detected and ranked packets in this first step are processed starting from the highest SNIR one in the following way:

data-aided channel estimation for the selected packet is performed over the preamble by a burst DS/SS (Direct Sequence Spread Sequence) demodulator, which is also responsible for retrieving payload information from the received packets;

FEC decoding of the selected packet is performed; if FEC decoding is considered as successful after CRC (Cyclic Redundancy Check), then:

(a) Enhanced data aided channel estimation (carrier frequency, phase, amplitude, timing) is performed over the whole recovered packet;

(b) The detected packet is reconstructed at baseband (DS/SS burst regeneration block RG); and (c) Interference cancellation is performed by an interference cancellation processor ICP.

The processing steps are iterated a predetermined number of times ($N_{max}$), then the processing window is shifted. The predetermined iteration number is set at the highest value compatible with real-time processing of the received signals. This iterative process is particularly useful for the initial transient when the SIC algorithm is converging and achieving steady state conditions, for the cases where power unbalance between packets is high (e.g. standard deviation $\sigma \geq 3$ dB), or when the system load is forcing the decoder to operate at very high Frame Error Rates ($FER^i \approx 10^{-1}$). In practice, once the steady-state SIC condition is reached one can limit the SIC iterations to a lower value (e.g. no more than three times over a given window position). However, it is suggested to keep a higher number of iterations (e.g. 5 to 7) to allow rapid recovery after an overload situation and more efficient processing under high power unbalance conditions.

All the operations above are performed under the control of Gateway Demodulator Controller GDM.

It is important to note that, assuming the system is stable and packets are successfully decoded with a low Packet Loss Ratio (e.g. $PLR \cdot 10-3$), the processing window PW contains at any time a number of packets which have already been recovered at a previous step (e.g. packets 3 to 7 at step k-1), and whose interferences has already been canceled. This means that packets arriving first at each window step (e.g. packets 8 and 9 for window step k) are affected by a lower interference level than later arriving packets; therefore they are the best candidates for initial packet reception and interference cancellation. On average, thanks to the sliding window mechanism, packets experience half interference than in prior art processing methods.

It should be remarked that the input IF signal, once converted in digital and stored may be processed in both a hardware platform composed of re-programmable FPGAs (Field Programmable Gate Arrays) and DSP (Digital Signal Processing) devices or in a software-based platform. In fact, the Data Processing Unit DPU of the Gateway Receiver GW can advantageously be implemented in the form of a software platform composed by a cluster of computers interconnected by a high-speed interface to the digital memory and among them. This allows a low-cost modular gateway demodulator implementation. In this approach the most processing demanding functionalities are the packet detection and the turbo decoding sub-systems. Some hardware co-processor may be envisaged to optimize the computational capabilities of a software-based platform.

For several application, it is required that the receiver send an acknowledgement message to the gateway. This can contribute significantly to the downlink channel load. This is particularly true in mobile broadcasting applications where the forward link signaling capacity is very limited. Therefore it is advantageous to implement a smart acknowledgement scheme. According to particular embodiments of the invention, specific acknowledgement techniques on the application layer should be used when possible, instead of individual acknowledgements on the MAC layer. In particular:

When the delay between transmission and acknowledgement is not critical, it can be advantageous to wait until the terminal is under terrestrial coverage before submitting an acknowledgement;

Some applications may send messages to the hub station on a periodic basis; in this case the hub may send a cumulative acknowledgement or selective negative acknowledgement for example once every 10 messages.

Group applications may send several times the same information to the HUB (e.g. as a result of a group request). In those cases, one single acknowledgement to the group can be sent, instead of individual acknowledgements for each individual message received, as all said messages contain the same information.

Particular steps of a method for receiving data packets according to the invention will be described in detail below. In order to make the description more concrete, reference will be made to an exemplary satellite communication system, whose main characteristics are summarized in table I below, wherein:

FL and RL mean forward link (downlink) and return link (uplink) respectively;

HPA means High Power Amplifier;

C/I means Satellite Antenna Carrier-to-Interference ratio; and

G/T means user terminal antenna gain over noise temperature ratio.

TABLE I exemplary system parameters:

| Parameter | Value for FL | Value for RL |
|---|---|---|
| Satellite orbit | GEO | GEO |
| Carrier frequency | 2 GHz | 2 GHz |
| Total bandwidth | 15 MHz | 15 MHz |
| Frequency reuse pattern | 3 | 1 or 3 |
| Satellite antenna beams | 6 | 6 |
| Satellite antenna G/T | NA | 12 dB/K |
| Maximum RF EIRP power per beam | 62-65 dBW | NA |
| Messaging ST HPA maximum power | NA | 1 W |
| ST Rx/Tx antenna gain | 4 dBi | 4 dBi |
| Clear sky ST G/T | −20 dB/K | NA |
| Other beams C/I | 12 dB | 10 dB |
| Other systems interference | NA | NA |
| Digital Transmission Technique | TDM or OFDM | NA |
| Single Frequency Network operation | No | No |
| Multiple Access Technique | NA | DS-CDMA |
| Modulation | QPSK | BPSK |
| Coding Rate | Configurable as per DVB-SH | 1/3 |
| Chip Rate | NA | 3.84 Mcps |
| Carrier Bandwidth | 5 MHz | 5 MHz |
| Packet Payload Size | 12800 bits | 100-1280 bits |
| $E_b/(N_0 + I_0)$ AWGN threshold | As per DVB-SH | 1.4 dB |

The system in the forward link (FL) implements the DVB-SH standard, which can be either TDM or OFDM based: see ETSI EN 302 583 V1.1.0 (2008-01) European Standard (Telecommunications series) Digital Video Broadcasting (DVB) "Framing structure, channel coding and modulation for Satellite Services to Handheld devices (SH) below 3 GHz". Use of the TDM version of the DVB-SH (SH-B) or the non single frequency network (SFN) version of the OFDM (SH-A) in the forward link is recommended, because the OFDM SFN operation would not allow packet uplink protocol to work properly. The system in the return link (RL) is an adaptation of the 3G wireless terrestrial standards (3GPP): see 3GPP TS 25.104 v3.14.0, "Radio transmission and Reception (FDD); Release 1999", March 2007. Note that the return link payload packet size suggested is 1280 bits although for sake of simulation time most of the following results refer to 100 bits.

Packet detection (or identification) is the first processing step of the method described above, following the storing of the received data in the processing memory.

Moreover, packet detection is a critical step, as the demodulator shall initially be able to detect the packet which can be decoded with high reliability i.e. very low missed detection probability in highly interfered conditions. In fact, because of the high MAC loading achieved by the proposed scheme, the initial packet acquisition unit will operate in much worst condition than a normal CDMA demodulator. As a consequence, this issue deserves a detailed discussion, starting with a review of prior art.

In the field of terrestrial UMTS RACH (Random Access CHannel) a typical energy per chip $E_c$ over noise plus interference power spectral density ratio $N_t = N_0 + I_0$ ($E_c/N_t = -26$ dB is required for preamble acquisition with 90% probability of detection. See J.-W. Chung, Il-Soon-Jang, Y.-G. Jeong, "Effect of Code Acquisition Design Parameters in the IMT-2000 System", 52nd Vehicular Technology Conference, IEEE VTS-Fall VTC 2000, Volume: 4, pp. 1627-1631 vol. 4, Boston, Mass., USA.

A comprehensive UMTS RACH MAC layer analysis is reported in the paper by I. N. Vukovic, T. Brown, "Performance analysis of the random access channel (RACH) in WCDMA", Vehicular Technology Conference, VTC 2001 Spring 2001, Volume: 1, pp. 532-536, where it is shown that, thanks to the specific random access channel mechanism implemented in 3GPP W-CDMA, the resulting capacity is significantly higher than in the slotted Aloha case. The reason for this is that the Preamble phase effectively provides carrier-sensing capability. In other words, if a Preamble is not acknowledged, the message is not sent and it is assumed that a Preamble by itself does not corrupt the ongoing message transmission. Unfortunately, this carrier-sensing mechanism can not be applied to a satellite system.

Concerning the satellite specific environment, 3GPP W-CDMA adaptations where investigated in D. Boudreau, G. Caire, G. E. Corazza, R. De Gaudenzi, G. Gallinaro, M. Luglio, R. Lyons, J. Romero-Garcia, A. Vernucci, H. Widmer, "Wideband CDMA for the Satellite Component of UMTS/IMT-2000" IEEE Trans. on Vehic. Technology, Vol. 51, No. 2, March 2002, pp 306-330. The main differences with the forward link acquisition case, lie into the fact that the preamble is transmitted only once, and then the probability of missed detection must be kept much lower.

In this paper, a threshold-crossing strategy has been adopted; simulation results indicate that with a 48 symbol long preamble (instead of 16 as in 3GPP) a good Receiver Operating Characteristic (ROC) is achieved at an energy per symbol ($E_s$) over noise plus interference power spectral density ratio $N_t E_s/N_t = 0$ dB which corresponds to $E_c/N_t = -24$ dB. For the present application, a longer preamble of at least 128 symbols or 32768 chips would be required to operate at $E_c/(N_0 + I_0) = -30$ dB; such an extended preamble would represent a too high overhead compared to the useful information part of the packet i.e. 300 symbols (these values are based on the exemplary system described above). For this reason a larger packet payload size is suggested (e.g. 1280 bits).

Another aspect to be considered is the possible advantages to use a Maximum Likelihood Constant False Alarm Rate (CFAR ML) packet acquisition unit instead of a threshold crossing approach. See for example R. De Gaudenzi, F. Giannetti, M. Luise, "Signal Recognition and Signature Code Acquisition in CDMA Receivers for Mobile Communications," IEEE Trans. on Vehic. Tech., Vol. 47, No. 1, February 1998. The CFAR ML approach allows getting Maximum Likelihood code phase detection performance at affordable complexity with an automatic detector threshold setting for the signal presence recognition which achieves CFAR. The code matched filter technique proposed in this paper can be further enhanced by replacing the non-coherent correlation combining with a differential one as suggested by:

G. E. Corazza, P. Salmi, A. Vanelli-Coralli, M. Villanti, "Differential and non coherent post detection integration techniques for the return link of satellite W-CDMA systems", The 13th IEEE International Symposium on Personal, Indoor and Mobile Radio Communications, September 2002 Volume 1, pp. 300-304; and:

G. E. Corazza, R. Pedone "Generalized and average post detection integration methods for code acquisition," IEEE Eighth International Symposium on Spread Spectrum Techniques and Applications, September 2004, pp. 207-211.

Figure 3A:
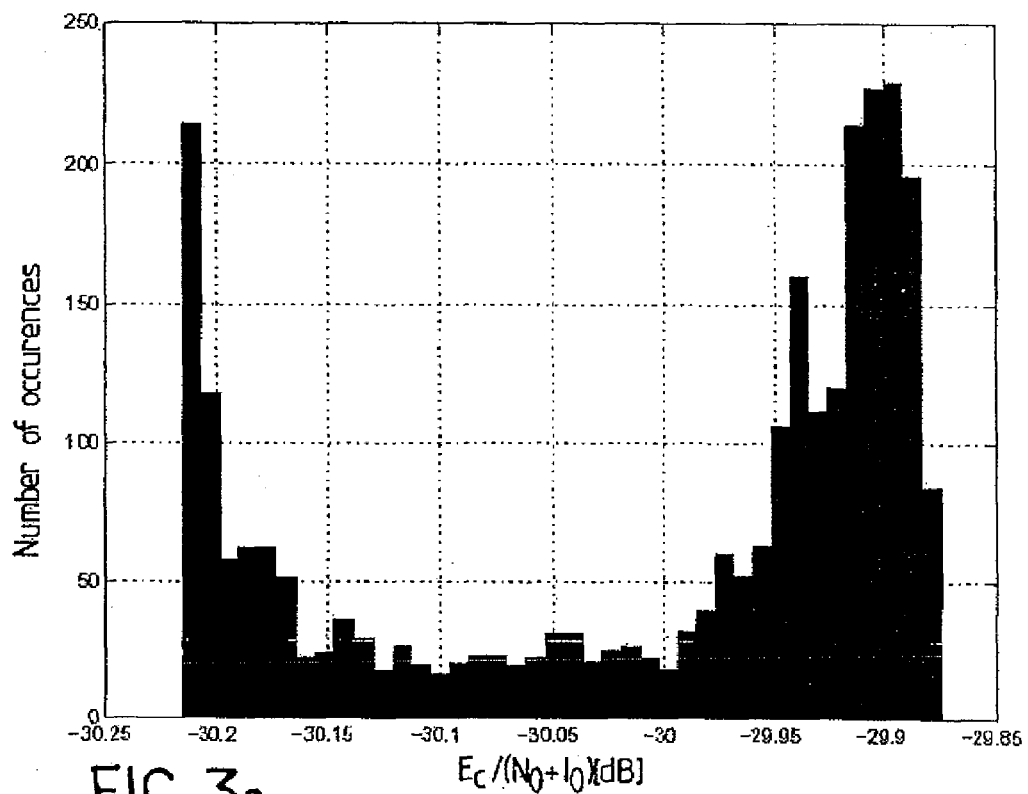
FIGS. 3a and 3b, plots of the SNIR probability density function at the Gateway for an exemplary CDMA system for balanced and unbalanced power, respectively.
Figure 3B:
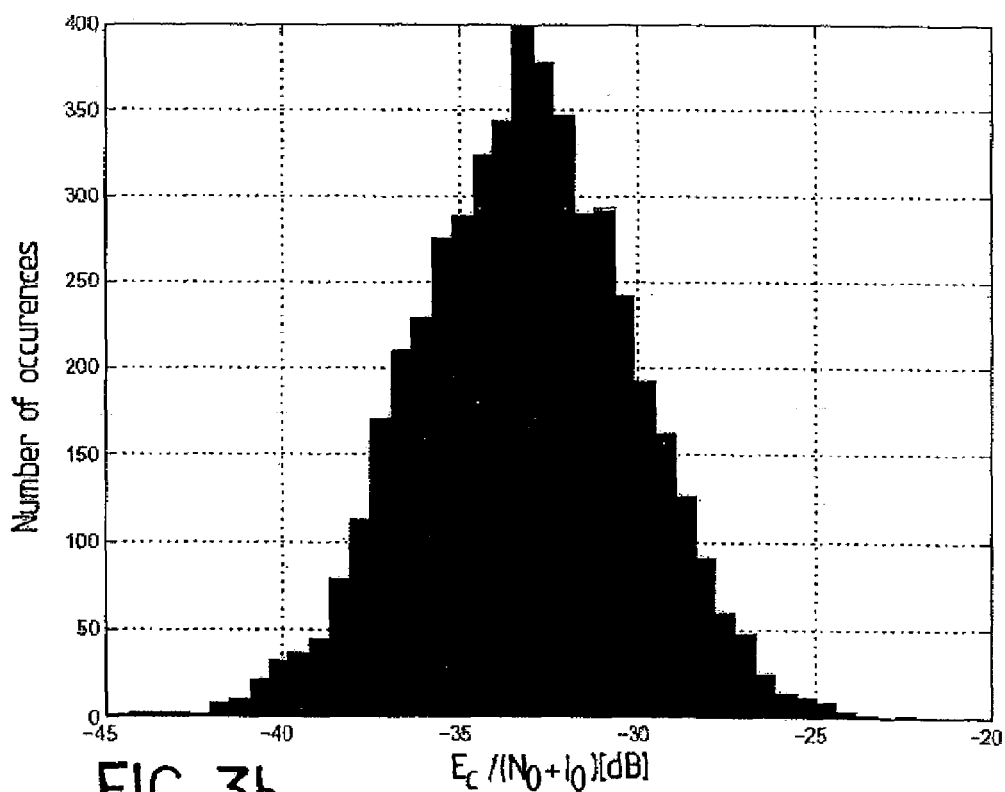

Before going into future more in-depth simulation of the satellite return link packet detector performance with realistic CDMA load some initial problem assessment is necessary. First of all, in FIGS. 3a and 3b the gateway packet detector SNIR distributions for balanced and unbalanced carrier power are reported. The simulation results have been obtained over a window of 900 symbols for a typical load condition in case of: a) balanced CDMA carrier power (G=1.2 b/s/Hz) and b) for unbalanced carrier power with lognormal power distribution with σ=3 dB. More specifically FIG. 3a provides an example of simulated $E_c/(N_0+I_0)$ for BPSK with $E_b/N_0$=10.7 dB, σ=0 dB, G=1.2 b/s/Hz. This MAC loading corresponds to about 1000 simultaneous CDMA packets (in average) which implies an $E_c/I_0 \approx 30$ dB. The simulated SNIR PDF over a 900 symbols window (following initial transient) show a SNIR distribution between $-30.2 < E_c/(N_0+I_0) < -29.8$ dB. For the 3GPP preamble baseline of 4096 chips the $[SNIR]_{pre}(-30)$=6.12 dB. From results contained in the above-referenced paper by D. Boudreau et al. it appears that the ROC for this configuration will not be acceptable. Assuming instead a preamble length of 32768 chips such as in S-UMTS Family A baseline (see ETSI TS 101 851-3 V1.1.1 (2000-12), "Satellite Component of the UMTS/IMT2000 A family; Part 3: Spreading and Modulation") the SNIR after preamble correlation becomes $[SNIR]_{pre}(-30)$=15.15 dB. This correlator SNIR is acceptable for initial detection. Concerning the payload data bits detection the $E_s/(N_0+I_0)(-30)$=−5.9 dB which looks marginal to start the SIC iterative process. FIG. 3-b provides an example of simulated $E_c/(N_0+I_0)$ for BPSK with $E_b/N_t$=10 dB, σ=3 dB, G=4.5 b/s/Hz. To this MAC loading corresponds about 1700 simultaneous CDMA packets in average which implies an $E_c/I_0 \approx -32$ dB. The simulated SNIR PDF (Probability Density Function) over a 900 symbols window (following initial transient) show a SNIR distribution between $-45 < E_c/(N_0+I_0) < -22$ dB. Assuming a preamble of 4096 chips $[SNIR]_{pre}(-22)$=14.1 dB which is considered good for packet detection for the best packet(s) but not for the average SNIR. Payload detection will experience a best case $E_s/(N_0+I_0)(-22)$=2.1 dB which is more than good to start the SIC (the FEC threshold is at around $E_s/(N_0+I_0) \approx -4$ dB). Clearly the use of the S-UMTS Family A preamble will provide much more conformable operating conditions for the RACH burst demodulator.

Figure 4:
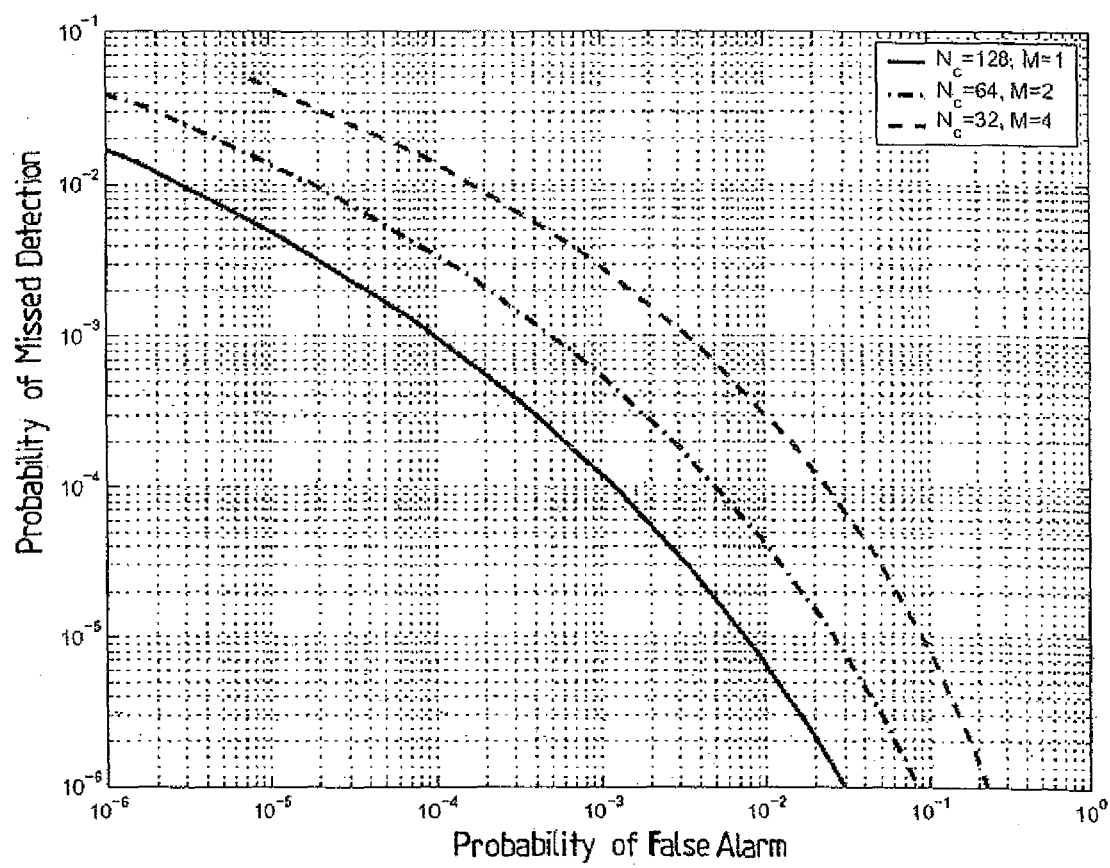
FIG. 4, a plot of ROC (Receiver Operating Characteristics) of said exemplary CDMA system for various lengths of the correlator coherent integration, assuming a preamble length of 128 symbols.

The Receiver Operating Characteristic (ROC) is obtained by plotting the probability of missed detection $P_{md}$ versus the probability of false alarm $P_{fa}$ as a function of the detector threshold normalized to the noise variance λ. $P_{md}$ and $P_{fa}$ can be computed as:

$$P_{md}(\lambda) = Q_M(\sqrt{\rho}, \sqrt{2\lambda})$$

$$\rho = \Gamma(\Delta f T_c) \text{sinc}\left(\frac{1}{2p}\right) 2MN_c M \frac{E_c}{N_0}$$

$$\Gamma(\Delta f T_c) = \left[\frac{\sin(\pi \Delta f L_c T_c)}{L_c \sin(\pi \Delta f T_c)}\right]^2$$

$$P_{fa}(\lambda) = \sum_{i=0}^{M-1} \exp[i \ln(\lambda) - \ln(i) - \lambda]$$

$$Q_M(\alpha, \beta) = \frac{1}{\alpha^{M-1}} \int_\beta^\infty x^M \exp\left\{-\left(\frac{x^2+\alpha^2}{2}\right)\right\} I_{M-1}(\alpha x) dx$$

where $N_c$ represents the number of coherent integration chips, M is the number of non coherent post integrations, p is the number of samples per chip and $Q_M(\alpha,\beta)$ is the modified Marcum function. The preamble length in chips is $N_p=N_cM$ while its length in symbols $L_p$ is given by $L_p=N_p/W$ being W=256 the length of the Walsh Hadamard sequence used for the preamble. A preliminary preamble detector ROC performance characteristic has been derived in FIG. 4 for various lengths of the correlator coherent integration for a preamble length of 128 symbols (corresponding to $N_p$=32768 chips). Results obtained in the absence of frequency error shows that probability of miss detection and false alarm is below $10^{-3}$. In practice, as discussed in the following the coherent correlation shall be broken in smaller intervals due to the incoming packet residual frequency error. As shown in FIG. 4 the corresponding ROC performance are degraded compared to the full coherent integration approach. Using differential instead of non-coherent detection, the initial carrier frequency error loss can be contained but most likely a preamble length of 128 symbols will be marginal in terms of ROC performance: see G. E. Corazza, P. Salmi, A. Vanelli-Coralli, M. Villanti, "Differential and non-coherent post detection integration techniques for the return link of satellite W-CDMA systems", The 13th IEEE International Symposium on Personal, Indoor and Mobile Radio Communications, September 2002 Volume 1, pp. 300-304.

Concerning the return frequency error, it is considered that by using the GPS reference at the mobile terminal a very good transmit frequency accuracy can be achieved. Assuming that the satellite Doppler is pre-corrected at the gateway station, the main frequency error source will be due to the satellite frequency conversion errors. The frequency error induced ROC correlation loss computation of $\Gamma(\Delta f T_c)$ shows that for a return link frequency uncertainty of $10^{-8}$ (109 Hz at 10.9 GHz) for 4 parallel correlators spaced by 218 Hz, the coherent correlation loss would amount to 0.79 dB. However, the loss would increase to 4.3 dB for a return link frequency uncertainty of $3 \times 10^{-8}$ (327 Hz at 10.9 GHz). The number of parallel correlators can be reduced using shorter coherent correlation time to increase the amount of maximum tolerable frequency error. In this case the ROC performance would degrade as shown in FIG. 4. Efficient ways to implement parallel frequency acquisition with reduced performance loss are described by:

M. K. Sust, R. F. Kaufmann, F. Molitor, G. A. Bjornstrom, "Rapid acquisition concept for voice activated CDMA communication", Global Telecommunications Conference, 1990, GLOBECOM 1990, San Diego (CA), USA, 2-5 Dec. 1990, vol. 3, pp. 1820-1826; and Mark C. Reed, "Acquisition for Satellite UMTS with Large Frequency Offsets", In the Proc. Of EMPS2002, 5th European Workshop on Mobile/Personal Satcoms, (Baveno-Stresa, Lake Maggiore, Italy), 25-26 Sep. 2002. This paper is accessible on the Internet at URL http://axiom.anu.edu.au/~mreed/papers/emps2002a.pdf.

The discussion above leads to the preliminary conclusion that the ETSI S-UMTS Family A of the standard derived from the 3GPP W-CDMA standard provides a solid starting point for the design of a system of the kind of the invention. The CDMA packet acquisition device (preamble searcher block PS on FIG. 1) need to search in parallel for: a) all possible spreading sequences used in the system; b) all possible spreading sequence delays; c) a number of carrier frequency bins to reduce the correlation losses.

Packet identification is impossible in the event of collision, i.e. when two packets are received using the same spreading code covering the full preamble duration with the same phase. The collision probability can be computed as:

$$P_{coll}(N_{codes}) = \sum_{i=1}^{+\infty} f_{Poisson}(i, \lambda_c)\left[1 - \left(1 - \frac{1}{N_{codes}}\right)^i\right]$$

$$f_{Poisson}(k, \lambda_c) = \frac{\lambda_c^k \exp(-\lambda_c)}{k!}$$

$$\lambda_c = \frac{G}{L_i}$$

where:

$N_{codes}$ is the number of spreading sequences among which the user terminals can choose the sequence effectively used for packet transmission;

G is the MAC channel normalized load measured in information b/s/Hz;

$L_i$ the packet length in information bits; and $\lambda_c$ is the packet arrival rate in packets/chip.

For the derivation of $\lambda_c$, the transmit square-root raised-cosine filter roll-off factor has not been taken into account and it has been considered that the signal bandwidth and the chip rate $R_c$ are equivalent. Therefore, the normalized channel load G can also be expressed in bits/chip. For the case where $N_{codes}=1$, the equation above reduces to the probability that two or more packets are received at the gateway demodulator within a chip interval, i.e.

$$P_{coll} = \sum_{i=1}^{+\infty} f_{Poisson}(i, \lambda_c) = \sum_{i=1}^{+\infty} \frac{\lambda_c^i \exp(-\lambda_c)}{i!} = 1 - \exp(-\lambda_c).$$

Figure 5:
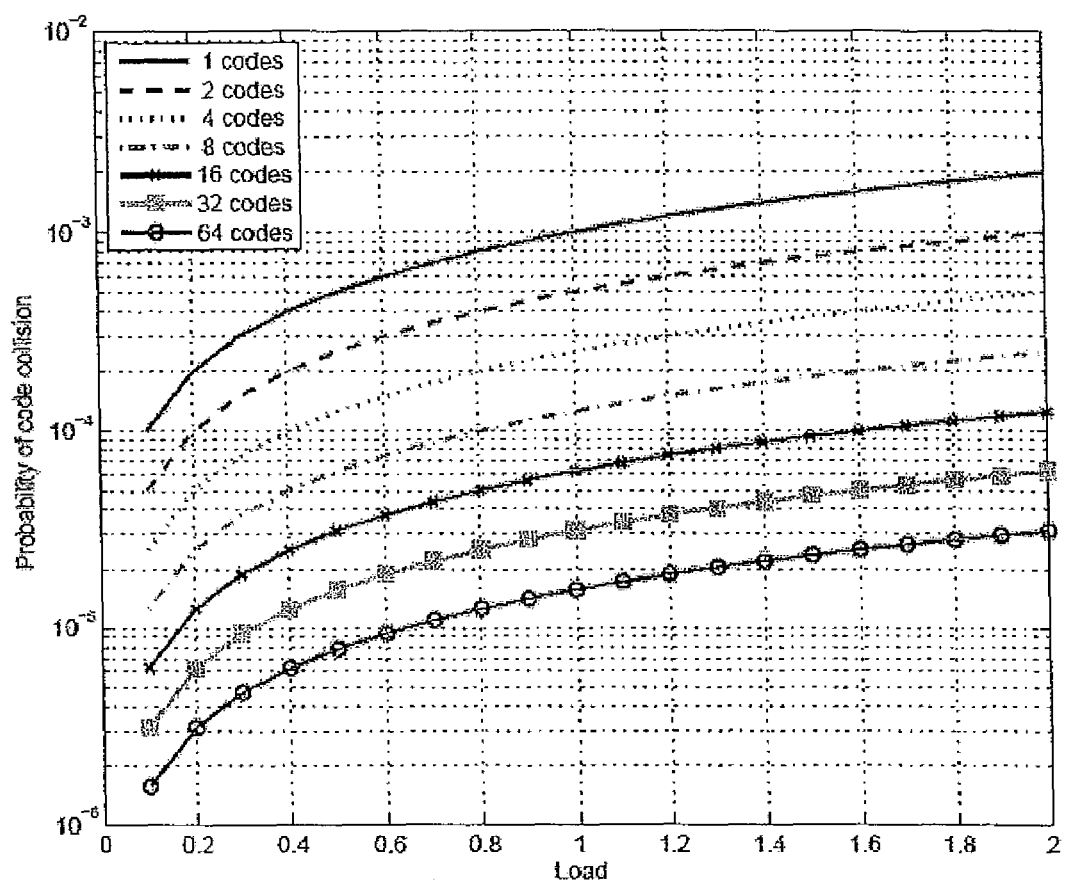
FIG. 5, a plot of the probability of code collision versus normalized load G for packets having a length of $L_i$=1000 information bits, for different numbers of available spreading sequences.

An example of probability of collision calculation for $L_i=1000$ bits can be found in FIG. 5. It should be remarked that the results contained in FIG. 5 provide a pessimistic view about the code collision impact in terms of performance. In reality even a code phase aligned colliding packet can make the packet decodable if the physical layer FEC is powerful enough to mitigate the effect of a chip synchronous interfering packet. This is particularly true for practical systems whereby the number of different code sequences can be minimized by exploiting the received packets power and carrier frequency diversity. This will mitigate the probability of destructive effects due to collisions between chip aligned sequences.

Thanks to the equations above it is possible to show that, for large packet sizes (e.g. 1000 bits), a few spreading codes (e.g. <4) can be sufficient.

As explained above, the detected packet having the highest SNIR value is selected for being decoded and for performing the first step of successive interference cancellation. SNIR measurement will be discussed below, while describing in detail the SIC algorithm and its performances.

Channel estimation based on the selected packet is necessary for both packet decoding and for interference cancellation.

The first task is not very critical because:
the chip timing can be derived from the preamble acquisition process using for example known feed-forward clock timing estimators such as the Oerder and Meyr reported in H. Meyr, M. Moeneclaey, and S. A. Fechtel, Digital Communication Receivers: Synchronization, Channel Estimation and Signal Processing, Wiley Press, 1998;
the useful data information is BPSK modulated, thus very robust against possible carrier phase estimation errors.

The information bits packet size is quite small and the Data Aided (DA) preamble-based phase/amplitude estimation accuracy shall be good enough to correctly demodulate the payload data bits. Symbol timing information can be easily derived from the chip clock information as it is an integer sub-multiple of the chip clock.

In a conventional manner, channel estimation for packet decoding is based on the preamble only.

The second sub-task is more critical but can rely on packet CRC check to reliably declare if the packet is correct or not. Moreover, after a first rough channel estimation, the decoded packet can be re-encoded and modulated to completely wipe-out the modulation effect, which allows a second, finer, channel estimation more suitable to interference cancellation.

As a consequence ML estimation on the whole packet or on part of it is possible for carrier phase and amplitude prior interference cancellation step. Averaging over the packet to enhance channel estimation is highly recommended.

Decision-directed channel estimation based on the whole detected packet can be performed as disclosed by the above-mentioned document EP 1 686 746. A possible straightforward implementation of this concept is to include a data-aided amplitude estimator and a phased-locked loop (DA-PLL) for the packet data payload. The DA-PLL will be initialized by the preamble burst phase estimate to minimize the PLL transient. This is similar to what is often done in TDMA burst demodulators. The only "isolation" from the colliding packets for the PLL operation is provided by the processing gain of the direct sequence spread spectrum. Otherwise stated, the fact that colliding packets arrive with a different delay of the spreading sequence and a different payload data pattern allows channel estimation even in the presence of multiple access interference.

After packet detection and decoding and channel estimation, the selected data packet can be reconstructed at baseband and used for interference cancellation as in CRDSA (see document EP 1 686 746).

Successive Interference Cancellation (SIC) at the gateway is an important element of the E-SSA protocol of the invention. In particular, the invention provides an improved SIC method using a sliding processing window, as described above with reference to FIG. 2. The SIC algorithm within a specific processing window will now be discussed in detail.

The CDMA SIC performance has been evaluated by P. Patel and J. Holtzman in the following papers:

P. Patel, J. Holtzman, "Analysis of a DS/CDMA successive interference cancellation scheme using correlations", IEEE Global Telecommunications Conference 1993, GLOBECOM '93, Houston Tex. USA, 29 Nov.-2 Dec. 1993, pp. 76-80 vol. 1. 95; and P. Patel, J. Holtzman, "Analysis of a simple successive interference cancellation scheme in a DS/CDMA system", IEEE Journal on Selected Areas in Communications, June 1994 Volume 12, Issue 5, pp 796-807.

It is important to underline some key limitation of the analysis performed by these authors:

1. The traffic (i.e. number of interfering carriers) is assumed to be constant;

2. It is also assumed that all the interfering carriers can be removed even if they are delayed compared to the useful symbol under observation.

Indeed, although the papers refer to asynchronous CDMA, the analysis is in fact representative of a symbol-synchronous CDMA system.

3. The analysis only refers to continuous transmission symbol by symbol SIC i.e. not packet block processing.

The analysis below removes limitation n° 3 by introducing FEC with a threshold $E_b/N_t$. Limitation 2 is removed by the sliding window processing already discussed, and limitation 1 will be considered later.

The discussion below does not consider explicitly the sliding windows processing, which has already been described.

It is assumed that K CDMA signals (or Direct Sequence Spread Spectrum signals reusing the same sequence with different code phases) with spreading factor $W=R_c/R_s$, each characterized by a $SNR=[E_s/N_0](k)$ are received simultaneously. Assuming Gaussian CDMA MAI, each individual CDMA carrier signal-to-noise plus interference ratio can be computed as:

$$\left[\frac{E_s}{N_0+I_0}\right](m) = \frac{\left[\frac{E_s}{N_0}\right](m)}{1 + \frac{1}{W}\sum_{k=1, k\neq m}^{K}\left[\frac{E_s}{N_0}\right](k)}$$

The K CDMA signals are first correlated with the replica code over a symbol to allow their ranking in decreasing strength. We assume that after this ranking operation the following relation applies:

$$\left[\frac{E_s}{N_0}\right](m) \geq \left[\frac{E_s}{N_0}\right](m+1) \forall\, m$$

The CDMA carrier packet having the highest SNIR is demodulated first. If CRC shows that the packet has been demodulated correctly, its bits are re-modulated and the first carrier is removed using the amplitude and carrier phase estimated on the basis of a fraction of the full packet, having a length of Nay symbols or $WN_{av}$ chips. The averaging time for channel estimation is linked to the mobile user fading speed i.e. $N_{av}<cR_s/(f_0 v_{max})$ being the maximum mobile speed, c being the speed of light. This process is iterated for each signal present k=1; 2; 3; ... ; K.

At each step for analysis simplicity the CRC check will be replaced by the check if the SNIR is above the FEC threshold:

$$\left[\frac{E_s}{N_t}\right]_{th}$$

Adapting derivations contained in the above-cited papers by P. Patel and J. Holtzman, the SNIR at each SIC step can be analytically computed as:

$$\left[\frac{E_s}{N_t}\right]_{SIC}(j) = \frac{\left[\frac{E_s}{N_0}\right](j)}{\lambda(j)}$$

$$\lambda(j) = \begin{cases} 1 + \frac{1}{W}\sum_{k=j+1}^{K}\left[\frac{E_s}{N_0}\right](k) + \frac{1}{N_{av}W}\sum_{i=1}^{j-1}\lambda(i) & \text{if } \left[\frac{E_s}{N_t}\right]_{SIC}(j-1) \geq \left[\frac{E_s}{N_t}\right]_{th} \\ 1 + \frac{1}{W}\sum_{k=j^*+1, k\neq j}^{K}\left[\frac{E_s}{N_0}\right](k) + \frac{1}{N_{av}W}\sum_{i=1}^{j^*-1}\lambda(i) & \text{otherwise} \end{cases}$$

$$j^* = \min_j\left\{\left[\frac{E_s}{N_t}\right]_{SIC}(j) < \left[\frac{E_s}{N_t}\right]_{th}\right\}$$

The first term (1) of the λ(j) expression when the FEC packet is decoded corresponds to the thermal noise contribution to the SNIR. The second term in λ represents the residual CDMA MAI still to be cancelled at step j while the third term is representative of the residual noise floor due to the imperfect CDMA cancellation at previous SIC steps due to the amplitude estimation error. It is apparent that averaging over a large number of symbols drastically reduces the residual MAI impact. To better assess the residual interference cancellation noise impact on the SIC performance it is useful to also derive the "Gene Aided" (GA) SIC performance, which assume perfect cancellation in all SIC steps. In this case the equation above simplifies to:

$$\left[\frac{E_s}{N_t}\right]_{SIC}^{GA}(j) = \frac{\left[\frac{E_s}{N_0}\right](j)}{\lambda^{GA}(j)}$$

$$\lambda^{GA}(j) = 1 + \frac{1}{W}\sum_{k=j+1}^{K}\left[\frac{E_s}{N_0}\right](k)$$

The previous conjecture can be better appreciated looking at the following semi-analytical results. For a population of K CDMA carriers (packets), a random lognormal distribution of $[E_s/N_0](k)$ has been generated. Said distribution is characterized by a mean μ[dB], a standard deviation σ[dB]:

$$[E_s/N_0]_{LOS}[dB] = [E_b/N_0]_{LOS}[dB] + 10\log_{10}(r),$$

$$\left[\frac{E_s}{N_t}\right]_{th}[dB] = \left[\frac{E_b}{N_t}\right]_{th} + 10\log_{10}(r),$$

where r is the FEC coding rate.

In line with previous sections, it has been assumed that $$[E_b/N_0]_{LOS} = 13.7 \text{ dB},$$

$$\left[\frac{E_b}{N_t}\right]_{th} = 1.4 \text{ dB},$$

$$r = 1/3,$$

$$K = 1000,$$

$$\mu = -3 \text{ dB},$$

$$\sigma = 3 \text{ dB},$$

$$W = 256.$$

Figure 6A:
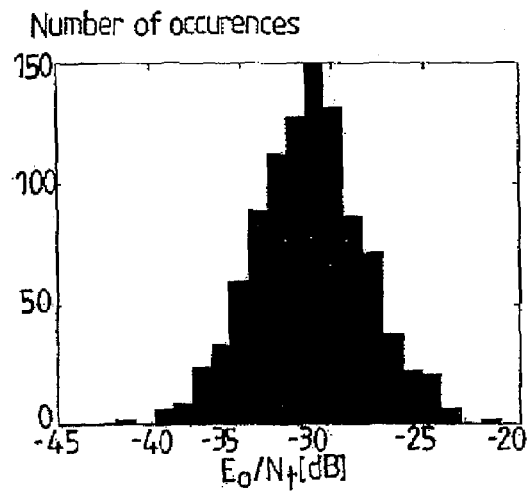
FIGS. 6a, 6b and 6c, plots illustrating the SIC performance for an exemplary CDMA communication system, assuming a decision directed channel estimation length of 48 payload symbols.
Figure 6B:
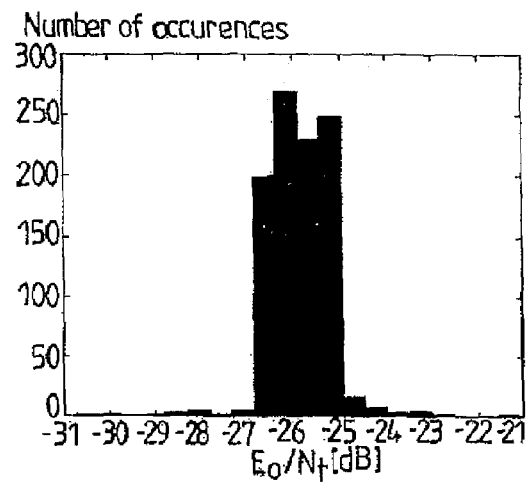
Figure 6C:
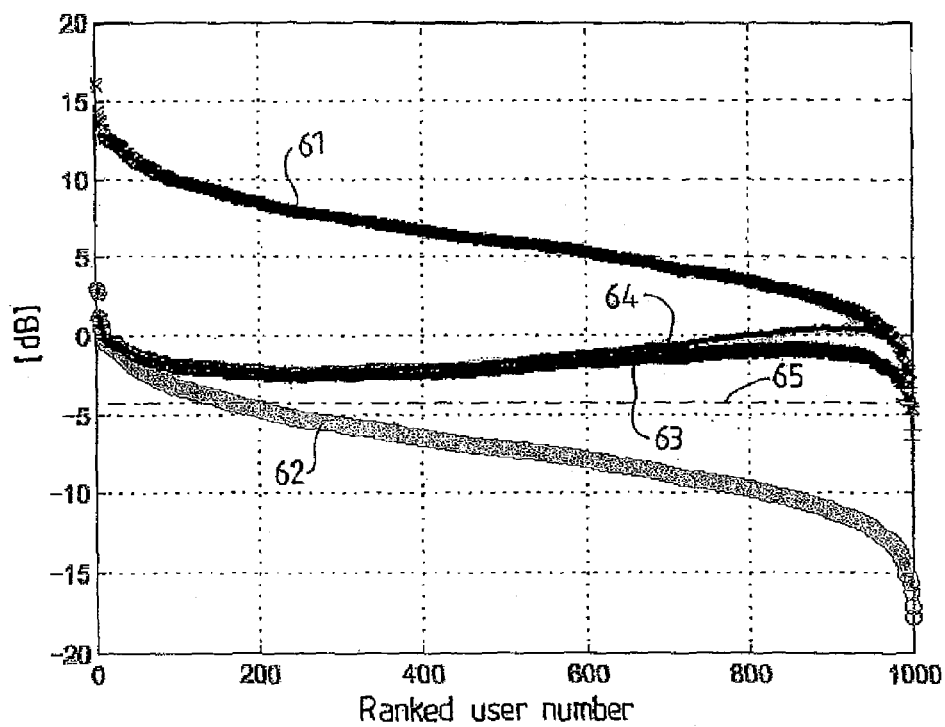
Figure 7A:
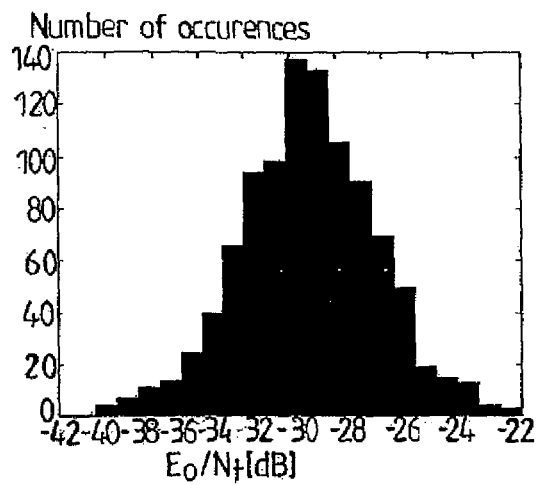
FIGS. 7a, 7b and 7c, plots illustrating the SIC performance for the same exemplary CDMA communication system, assuming a decision directed channel estimation length of 192 payload symbols.
Figure 7B:
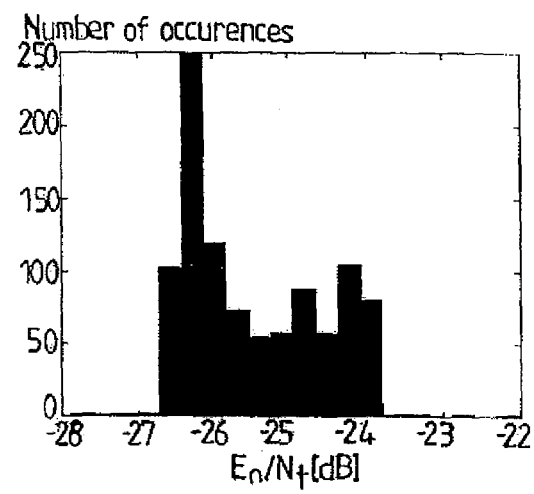
Figure 7C:
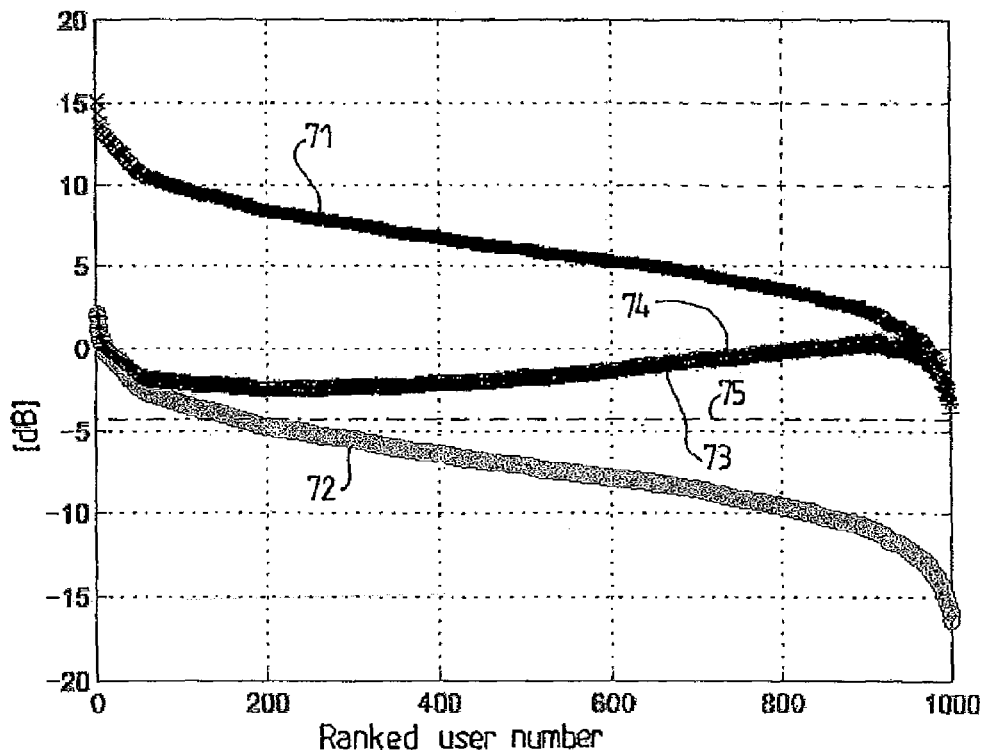

Two different values have been considered for $N_{av}$: $N_{av}$=48 (FIG. 6a-c) and $N_{av}$=192 (FIG. 7a-c). The latter quantity has been derived assuming $f_0$=2 GHz, $v_{max}$=170; 40 kmph, $R_s$=15 kbps. FIG. 6a shows the simulated $E_s/N_t$ before initiating the SIC process. Although in this case there is no Poisson traffic distribution but the number of CDMA carriers is constant (K=1000), this histogram closely resembles the one of FIG. 3b obtained with comparable loading for investigating the preamble detection. After applying SIC to the 1000 carriers we obtain the $E_s/N_t$ distribution shown in FIG. 6b. It is apparent that some carriers (packets) were not cleaned by the MAI, resulting in the leftmost histogram bins. This phenomenon can be better understood observing FIG. 6c. Here line 61 represents the received K=1000 carriers $E_s/N_0$ after the ranking operations. Line 62 shows the $E_s/N_t$ before the SIC process is started, line 63 indicates the $E_s/N_t$ after the SIC process is completed and line 64 represents $E_s/N_t$ after ideal (Gene Aided) SIC. Finally the dashed line 65 represents the FEC decoder threshold. Clearly the SIC successive cancellation process shows the greatest effects for the weakest carriers and tends to "equalize" the SNIR. However, it is apparent that approaching carrier ranked beyond 950 the $E_s/N_t$ rapidly decays because the low $E_s/N_0$, combined with the residual MAI, goes below the FEC threshold. Thus for the last few carriers no interference cancellation is possible. It is still possible to improve the performance of these weak carriers by increasing the averaging time (with respect to the CDMA MAI) for the amplitude estimation $N_{av}$ to 192. This will reduce the capability to track the fast fading amplitude, but the importance of tracking the fast fading may be not so critical. The corresponding improvement is shown in FIGS. 7a-7c (on FIG. 7c, lines 71-75 correspond to lines 61-65 on FIG. 6c). It is apparent that in this case the SIC perform better for the weakest carriers thanks to the improved amplitude estimation in the cancellation process reducing the residual MAI (see FIG. 7c). As a result, the SIC process is close to the gene aided one, $E_s/N_t$ at the end of the SIC process is higher (compare FIG. 7b with FIG. 6b) and all 1000 carriers result to be above the FEC at the end of the SIC process. It is clear that a second SIC stage may still be beneficial to further clean the signals and thus obtain overall even better performances. The gain by successive stage of SIC will be analyzed later.

Finally, FIG. 6a-c clearly show the need of having enough LOS link margin to avoid that the weakest CDMA packets can not be recovered because they are below the FEC threshold.

Assuming true that received packets power fluctuates around its nominal value $[E_b/N_0]_{LOS}$ [dB] with lognormal distribution characterized by a mean μ [dB] and a standard deviation σ [dB], the packet error floor probability for a packet to be incorrectly received in the presence of power fluctuations is given by:

$$P_{floor}\{\mu, \sigma, [E_b/N_0]_{LOS}\} = \frac{1}{\sigma\sqrt{2\pi}} \int_{-\infty}^{\infty} \Gamma_{FER}(\rho) \exp\left[-\frac{(\rho - \mu - [E_b/N_0]_{LOS})^2}{2\sigma^2}\right]$$

where the function $\Gamma_{FER}(\cdot)$ describes the FEC frame error rate function of the current $[E_b/N_0]$ [d B]. For the specific 3GPP Turbo FEC code considered here, it has been found that a good match with the simulated FER is provided by the following law:

$$\Gamma_{FER}\{\rho\} = \begin{cases} 10^{(-7.5598\ 10^{-5}\rho^8 + 1.90\ 10^{-4}\rho^7 + 6\ 10^{-4}\rho^6 + 7.79\ 10^{-4}\rho^5 + 0.0039\rho^4 - 0.0418\rho^3 - 0.224\rho^2 - 0.37122\rho - 0.21358)} & \text{if } \rho \geq -2 \\ 1 & \text{if } \rho < -2 \end{cases}$$

with $$\rho = \left[\frac{E_b}{N_t}\right] \text{ in dB}.$$

In the equation above it is assumed that the FEC FER performance $\Gamma_{FER}(\rho)$ is independent from the user speed and the channel conditions. This assumption is reasonable assuming a proper functioning of the physical layer interleaver i.e. a not too low mobile user speed.

Figure 8:
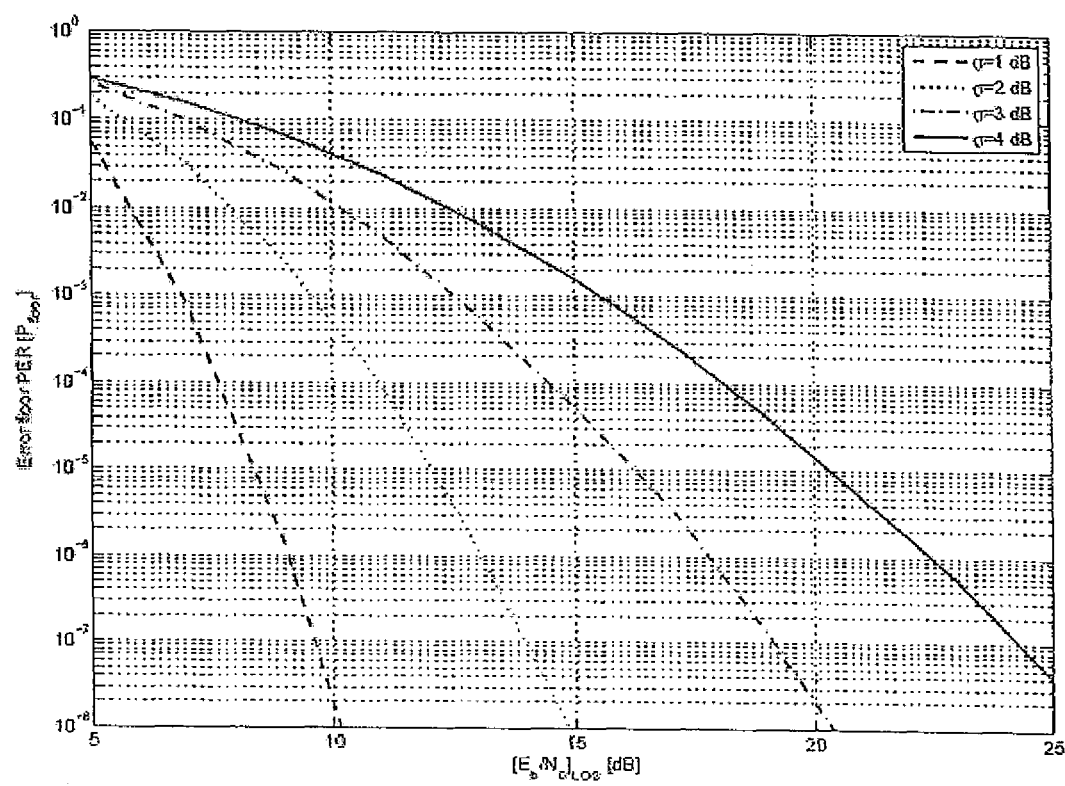
FIG. 8, a plot representing the packet loss ratio floor probability for a received packet as a function of the line-of-sight $E_b/N_0$ value.

FIG. 8 shows the dependency of $P_{floor}$ on $[E_b/N_0]_{LOS}$ for different values of $\sigma$. As expected, the required $[E_b/N_0]_{LOS}$ for given $P_{floor}$ rapidly increases with the lognormal standard deviation $\sigma$.

Interference cancellation alone is insufficient to ensure that an asynchronous CDMA uplink connection will work properly. Indeed, the transmission capacity of such a system is critically dependent on the working point at which it is operated, i.e. on the channel load and on the power unbalance between user terminals.

In order to underline the importance of transmission and congestion control, an evaluation of the MAC (Medium Access Control) performances of an exemplary asynchronous CDMA communication system will be considered. In particular, the analysis will focus on the uplink of the satellite communication system of table I.

The total uplink bandwidth has been split in chunks of 5 MHz following the nominal channel spacing specified in the 3G air interface standard (see 3GPP TS 25.104 v3.14.0, "Radio transmission and Reception (FDD); Release 1999", March 2007). Three terminal ST EIRP values have been considered for the messaging service: −2; 1 and 4 dBW. The main results of the uplink link budget are summarized in Table II below:

Using the results from the uplink budget in terms of CDMA single signal power and noise power spectral density at the satellite, a preliminary CDMA interference analysis has been performed to asses the baseline asynchronous CDMA achievable capacity under ideal power control assumption and the impact of the thermal power on the capacity. The analysis has been performed for system and waveform parameters listed in Table I. The maximum achievable capacity has been derived by isolating $I_0$ from the $E_b/(N_0+I_0)$ threshold given in Table I and using the $E_b$ and $N_0$ values derived from the link budget analysis (Table II).

According to a simple model, the multiple access channel interference power spectral density $I_0$ can be expressed as $$I_0 \simeq \overline{N}_{ST}^{act} \frac{P_{ST-msg}^{Rx}}{R_c}$$

where $\overline{N}_{ST}^{act}$ the average number of active user terminal (or, equivalently, satellite terminals) ST, $P_{ST-msg}^{Rx}$ the individual ST power received at the gateway and Rc the chip rate. This equation can be used to determine, for a given MAI power spectral density $I_0$, the maximum number $\overline{N}_{ST}^{act}$ of active ST. The information bit rate per ST has the been derived as follows:

$$R_b = \frac{R_c}{L_s} r\log_2(M) = 5 \text{ kbps}$$

A similar analysis has been performed neglecting thermal noise. The results are summarized in Table III. As it can be seen, for the case of ST with EIRP=−2, 1 and 4 dBW, the system capacity is reduced due to thermal noise by 20%, 10% and 5% respectively.

TABLE II

| Parameter | Unit | Case 1 | Case 2 | Case 3 |
| --- | --- | --- | --- | --- |
| Terminal EIRP | dBW | 4 | 1 | −2 |
| CDMA access type | | ASYNC | ASYNC | ASYNC |
| Bandwidth | MHz | 4.6848 | 4.6848 | 4.6848 |
| Roll-off Factor | | 0.22 | 0.22 | 0.22 |
| Chip Rate | Mchip/s | 3.84 | 3.84 | 3.84 |
| Spreading Factor | | 256 | 256 | 256 |
| Symbol Rate | ksymbol/s | 15 | 15 | 15 |
| Satellite Elevation Angle | degrees | 44.1 (Rome) | 44.1 (Rome) | 44.1 (Rome) |
| Free Space Loss | dB | 190.4 | 190.4 | 190.4 |
| G/T Satellite | dB/K | 8.5 | 8.5 | 8.5 |
| Satellite CDMA single signal power | dBW | −150.9 | −153.9 | −156.9 |
| Satellite noise Power-Spectral Density ($N_0$) | dBW/Hz | −201.6 | −201.6 | −201.6 |
| Satellite TXP input $C/N_0$ | dBHz | 50.7 | 47.7 | 44.7 |
| Satellite TXP input $E_c/N_0$ | dB | −15.1 | −18.1 | −21.1 |
| Satellite TXP input $E_s/N_0$ | dB | 8.9 | 5.9 | 2.9 |

TABLE III

| Parameter | Unit | Case 1 | Case 2 | Case 3 |
|---|---|---|---|---|
| ST EIRP | dBW | 4 | 1 | −2 |
| Max number of STs with thermal noise | | 523 | 491 | 426 |
| Aggregated Capacity with thermal noise | Mbps | 2.615 | 2.455 | 2.13 |
| Normalized Capacity with thermal noise | bps/Hz | 0.558 | 0.524 | 0.454 |
| Max number of STs w/o thermal noise | | 556 | 556 | 556 |
| Aggregated Capacity w/o thermal noise | Mbps | 2.78 | 2.78 | 2.78 |
| Normalized Capacity w/o thermal noise | bps/Hz | 0.593 | 0.593 | 0.593 |

The first thing to do, in order to perform such an analysis, is to determine the maximum Number of CDMA packets supported by a MAC Channel. A CDMA multiple access system is considered, for which the multiple access interference (MAI) can be assumed to behave as additive white Gaussian noise (AWGN). In general the aggregated MAI equivalent AWGN power spectral density seen at the gateway input for the k-th user can be written as $$I_0^{Rx}[k, N] \simeq \frac{1}{R_c} \sum_{l=1, l \neq k}^{N} \frac{P_l^{Rx}}{R_c}$$

where N is the total number of CDMA carriers received each having power $P_l^{Rx}$ and $R_c$ the corresponding chip rate. In the case of equi-powered carriers then $P_1^{Rx} = P_k^{Rx} \forall l$ and the equation above becomes:

$$I_0[k, N] \simeq \frac{(N-1)P_k^{Rx}}{R_c}$$

The MAI $I_0$ PSD computed before represents the equivalent CDMA interference PSD at the gateway receiver input. The digital demodulator behavior in front of the FEC decoder will perform channel estimation for baseband samples extraction and optionally multi-user detection through successive interference cancellation (MUD-SIC). Thus the equivalent MAI PSD seen by the FEC decoder can be expressed as:

$$I_0^{FEC}[k,N] = \alpha_{MUD} I_0^{Rx}[k,N]$$

where $0 < \alpha_{MUD} \leq 1$ represents the equivalent MAI MUD-SIC interference reduction factor. Let's assume, as it is the case in practice, a symmetric (uniform) distribution of the interfering packets start time around the time instant corresponding to the currently processed useful packet. Then it can be assumed that, in steady state conditions, only half of the packets interfering with the useful one will be cancelled by the SIC process. This is due to the "sliding window" algorithm described above. This means that assuming equi-powered carriers and a large enough window size, it can be assumed $\alpha_{MUD} = 0.5$, as only the packets which started between one time the packet duration prior and up to the useful packet start time have been already removed from the SIC process. In fact, the packets arriving after the start of the current useful packet will not be processed by the current SIC iteration. It should be remarked that the number of packets successfully cancelled will be lower during the initial transient due to the higher MAI initially present and not removed from past processing.

The SIC algorithm can be extended to provide iterative IC within a sliding window step (i.e. sliding window with iterative IC), but this requires more processing capabilities in the gateway demodulator Holding the assumption of assimilating MAI to AWGN in a simplified (and provisional) approach, the packet is correctly received if the following condition is verified:

$$\left[\frac{E_b}{N_0 + I_0[k,N]}\right] \geq \left[\frac{E_b}{N_t}\right]_{th}$$

where $[E_b/N_t]_{th}$ represents the threshold for packet detection. Experimentally it has been found that the threshold can be set to the $[E_b/N_t]$ value for which there is a packet error rate of about 10%.

It is assumed that the maximum CDMA load which can be supported by the random access system corresponds to $N_{max}$ which can be derived as:

$$\left[\frac{E_b}{N_0 + I_0[k, N_{max}]}\right] = \left[\frac{E_b}{N_t}\right]_{th}$$

Supposing that MAI carriers are equi-powered, it is obtained:

$$\left[\frac{E_b/N_0}{1 + (N_{max} - 1)\alpha_{MUD} E_c/N_0}\right] = \left[\frac{E_b}{N_t}\right]_{th}$$

which can be solved with respect to $N_{max}$ to give:

$$N_{max} = 1 + \frac{G_p}{\alpha_{MUD}} \left[\frac{1}{\left[\frac{E_b}{N_t}\right]_{th}} - \frac{1}{\left[\frac{E_b}{N_0}\right]}\right]$$

where $G_p = R_c/R_b$ is the CDMA processing gain.

The throughput obtained by applying an enhanced random access algorithm according to the invention can be computed by assuming that Spread Aloha packets follow a Poisson traffic distribution with intensity (number of events per unit time) $\lambda$. The probability that k packets are received in the time interval $\{t, t+\Delta\}$ is given by $$Pr\{N(t + \Delta) - N(t) = n\} = \frac{(\lambda \Delta)^n \exp(-\lambda \Delta)}{n!}$$

Assuming a slotted transmission, the RA packet will go through if in one slot ($\Delta = 1$ slot), the number of transmitted packets is less than $N_{max}$. Assuming now that G is the normalized MAC load (packets/slot), $\lambda$ is the traffic intensity (packets/sec) then $\lambda \Delta$ represents the number of packets/slot received on the RA channel. Under the Poisson traffic assumption, the probability P[n] that n users select the same slot for transmitting is then:

$$P[n, G] = \frac{(GG_p)^n \exp(-GG_p)}{n!}$$

The equation above considers that a packet is composed of P information bits each having duration Tb thus the MAC packet duration will be $PG_p$ chips. This means that the MAC time occupation is $G_p$ times bigger than a system without spreading. The MAC traffic intensity is thus $GG_p$.

The probability that the number of MAC users sharing the channel is less than $N_{max}$ is then given by:

$$P\{N \le N_{max}\}[G] = \sum_{n=0}^{N_{max}-1} P[n, G] = \sum_{n=0}^{N_{max}-1} \frac{(GG_p)^n \exp(-GG_p)}{n!}$$

The RA MAC throughput S in terms of packets/slot is then:
$$S(G) = \lambda P\{N \le N_{max}\} = GG_p P\{N \le N_{max}\}$$
and the MAC throughput in terms of b/s/Hz T is given by:

$$T(G) = \frac{S(G)}{G_p} = G^{\frac{G_p}{\alpha_{MUD}}\left[\frac{1}{\left[\frac{E_b}{N_t}\right]_{th}} - \frac{1}{\left[\frac{E_b}{N_0}\right]}\right]} \sum_{n=0}^{} \frac{(GG_p)^n \exp(-GG_p)}{n!}$$

The equation above represents an extension of the one derived, the absence of thermal noise and SIC, in the above-referenced paper by O. del Rio Herrero, G. Foti, and G. Gallinaro, "Spread-spectrum techniques for the provision of packet access on the reverse link of next-generation broadband multimedia satellite systems," IEEE Journal on Sel. Areas in Comm., vol. 22, no. 3, pp. 574-583, April 2004 in. It has been derived for the slotted case as it was simpler to derive a closed-form solution. However, if a sufficiently large processing gain $G_p$ is assumed and if the probability of code collision is neglected, the results are not expected to differ much from those for the unslotted case.

The MAC Packet Loss Ratio (PLR) can be simply computed as:

$$PLR = 1 - \frac{T(G)}{G}$$

Figure 9A:
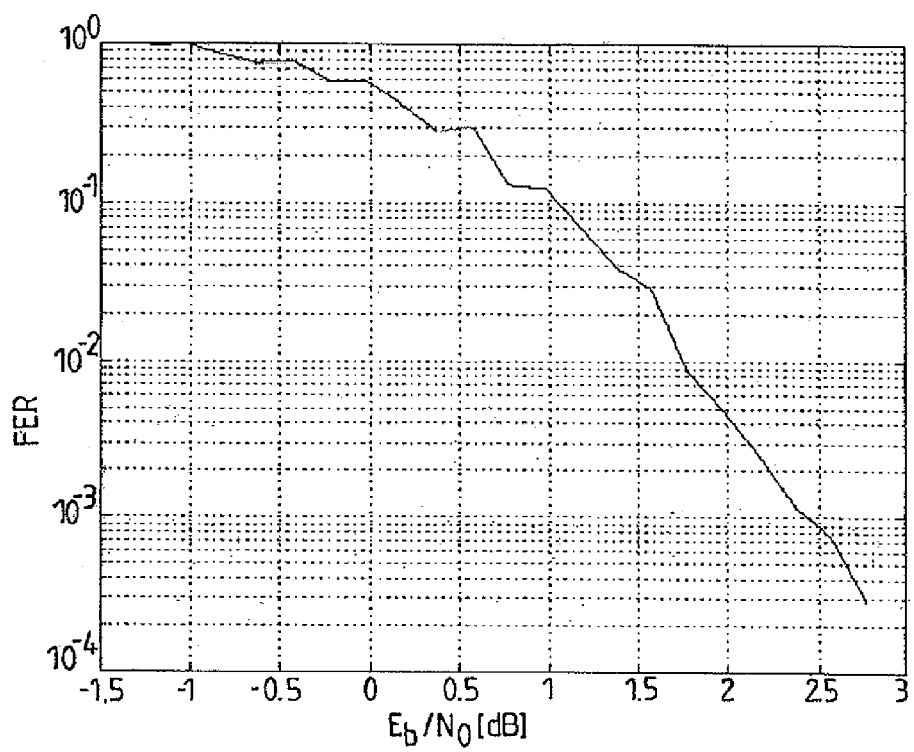
Figure 9B:
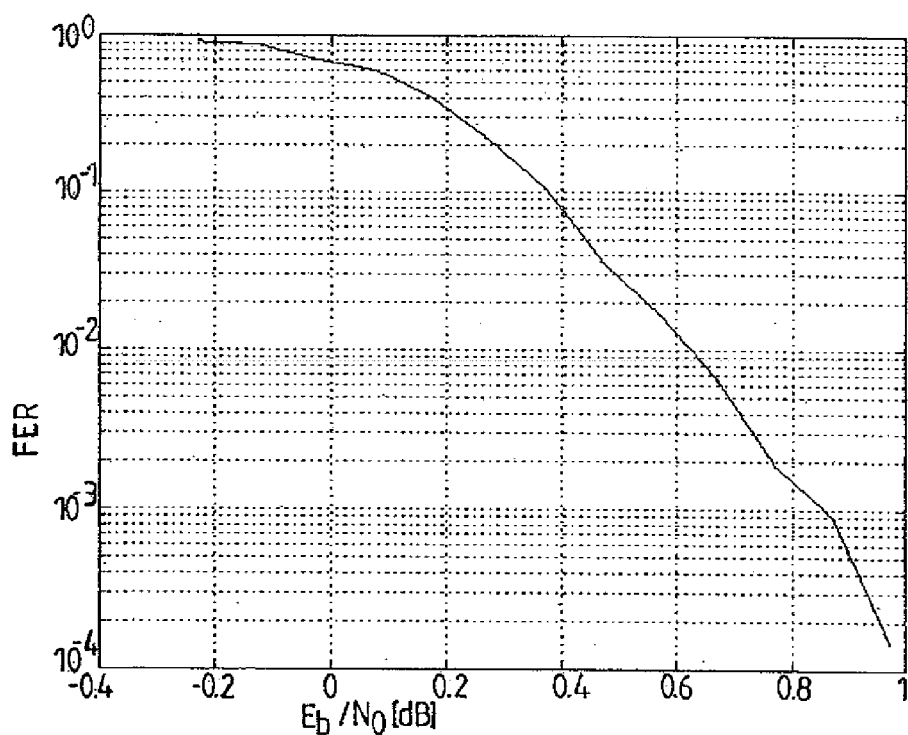

The 3GPP turbo FEC simulated performances (see 3GPP TS 25.104 v3.14.0, "Radio transmission and Reception (FDD); Release 1999", March 2007) are reported on FIGS. 9a and 9b for two different information bit block sizes at the FEC input (100 and 1280 bits respectively). It is apparent that by increasing the FEC information bits block size from 100 to 1280 bits the power efficiency improves by about 1 dB.

Figure 10A:
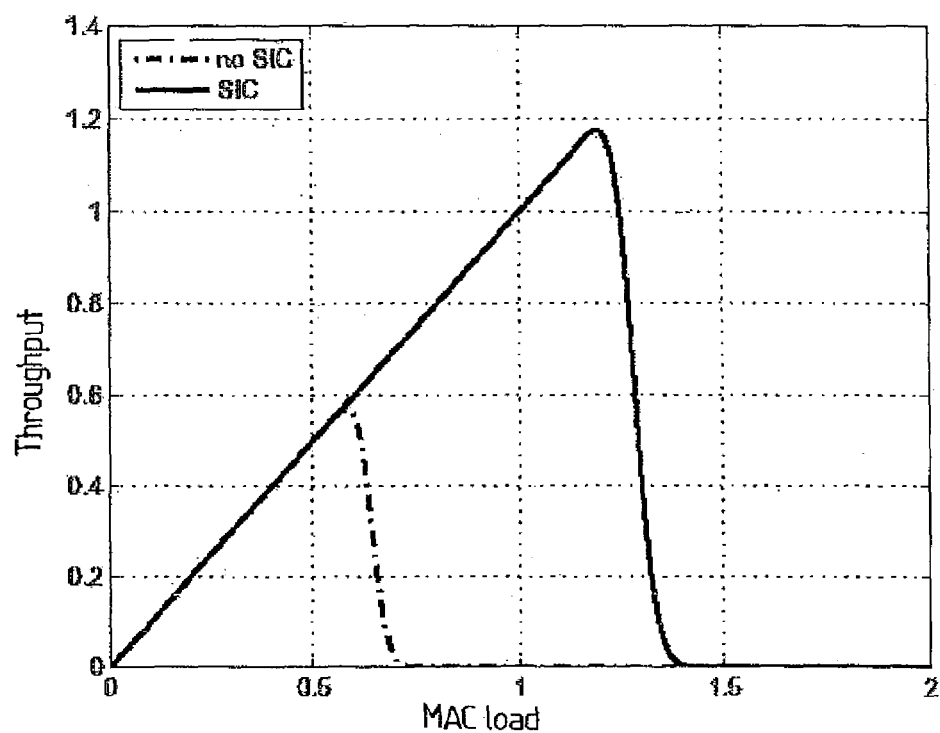
FIGS. 10a and 10b, the analytical MAC performances for a Spread Aloha system with or without SIC.
Figure 10B:
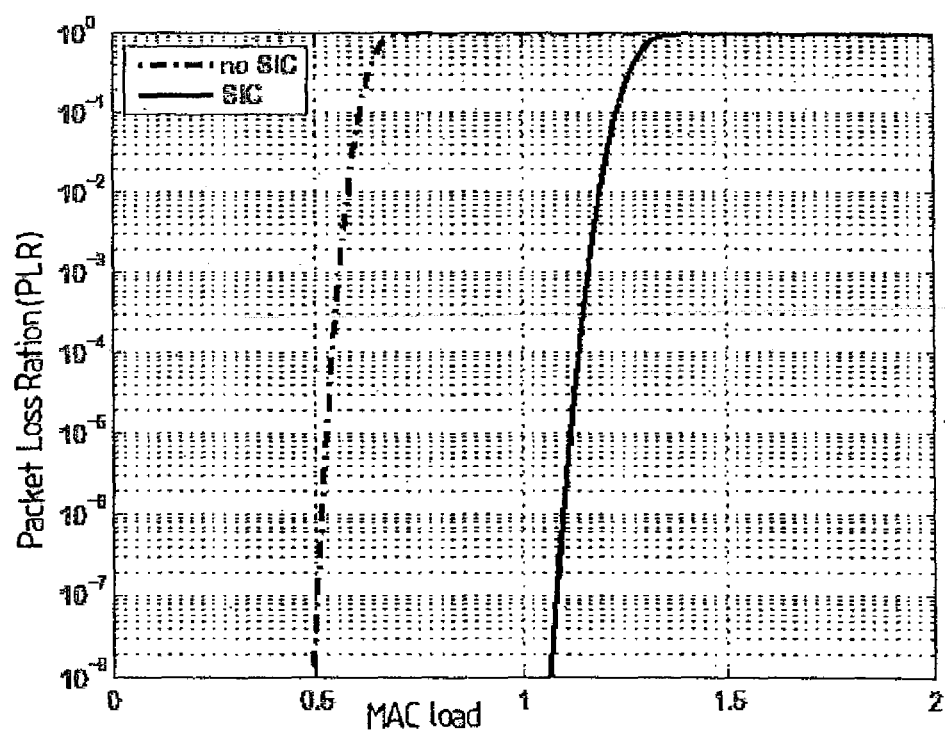
Figure 11A:
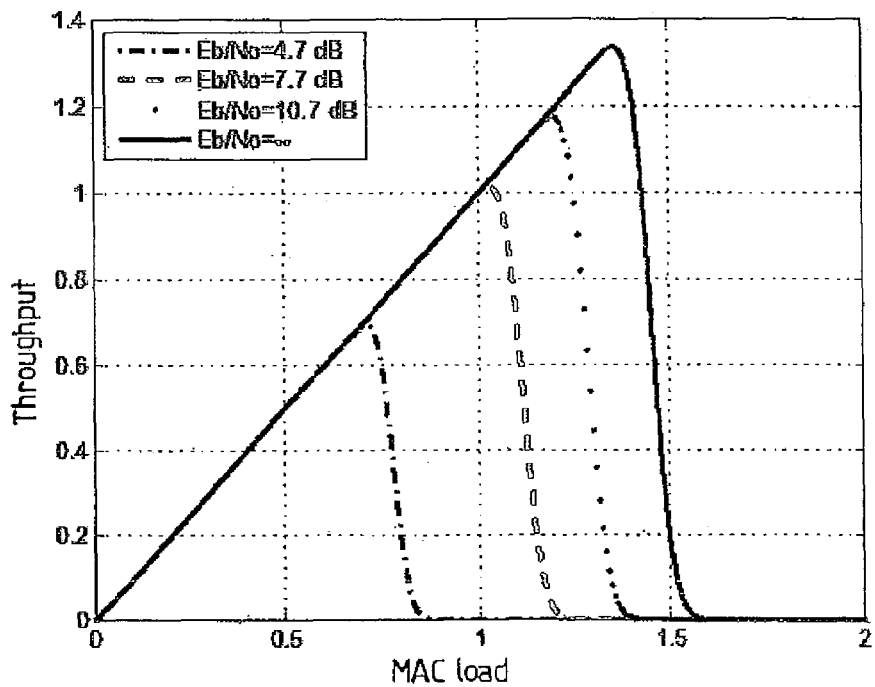
FIGS. 11a and 11b, the analytical MAC performance dependence on the thermal noise level for an Enhanced Spread Aloha system according to the invention (with SIC)
Figure 11B:
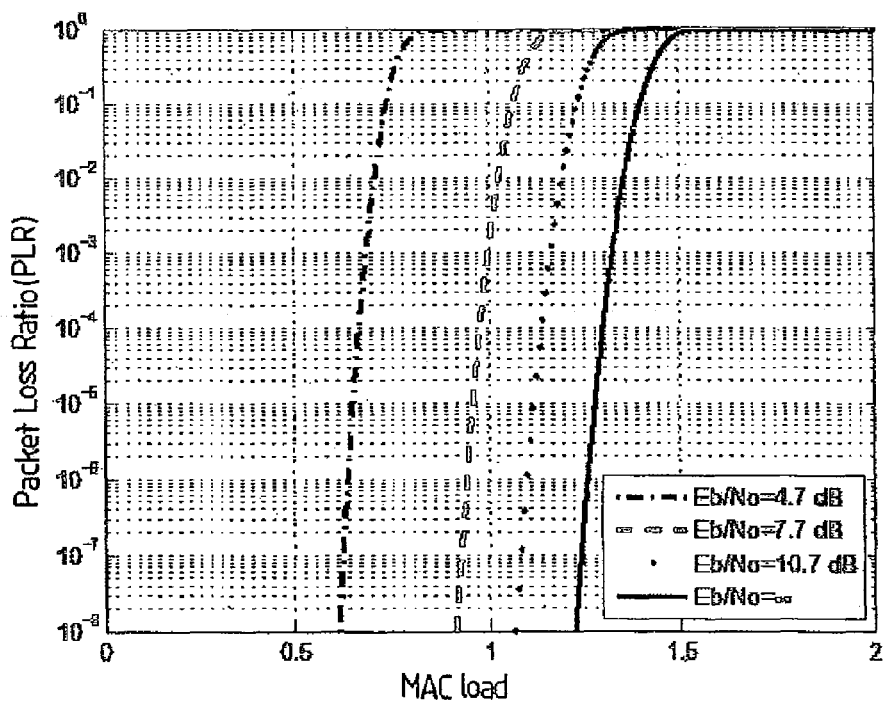

In FIGS. 10a and 10b the Spread Aloha MAC performances are illustrated for BPSK modulation, $E_b/N_t=10.7$ dB, $[E_b/N_t]_{th}=1.4$ dB (corresponding to a 100 information bits FEC block size), equi-powered carriers, $G_p=3\cdot256=768$, $\alpha_{MUD}=0.5$. More precisely, FIG. 10a represents the dependence of throughput from MAC load, with and without SIC; and FIG. 10b represents the dependence of PLR from MAC load, with and without SIC. It is observed that the SIC MUD addition boosts the spread Aloha MAC performance although further gain will be achieved using non equal power carriers. About 1.1 bps/Hz can be achieved with a PLR of about $10^{-5}$. FIGS. 11a and 11b show the MAC performance (throughput on FIG. 11a, PLR on FIG. 11b) dependence on the thermal noise level for a Spread Aloha communication system with SIC performed according to the invention. Analytical results for balanced power show that the thermal noise effect is progressively degrading the performance. A 10 dB or higher link margin over the demodulator AWGN threshold is desirable particularly when power is unbalanced. The AWGN thermal noise effect is very different if power is balanced vs. unbalanced. The latter case will be treated by simulation, as treatment by analysis it is not viable.

The results shown in FIGS. 10a/b and 11a/b have been obtained using the analytical models described above for T(G) and PLR(G), assuming that 50% of the interference can be cleared on average. Therefore the SIC case corresponds to $\alpha_{MUD}=0.5$ while the case without SIC corresponds to $\alpha_{MUD}=1$.

A set of performance analyzes have been carried out by using the simulator described above. The baseline set of parameters used for the simulations are described in Table IV below, where: $C_{LOS}$ is the Received Carrier Power at Satellite Transponder Input in Line-of-Sight conditions; $N_{AWGN}$ the Thermal Noise Power over the Carrier Bandwidth at Satellite Transponder Input; and TXP means Transponder.

TABLE IV

| Parameter | Value |
| --- | --- |
| Satellite orbit | GEO |
| Carrier frequency | 2 GHz |
| Carrier bandwidth | 5 MHz |
| $C_{LOS}$ input at sat TXP input | −151 dBW |
| $N_{AWGN}$ input at sat TXP input | 135.75 dBW |
| $E_b/(N_0 + I_0)$ AWGN threshold | 1.4 dB |
| Modulation | BPSK |
| Coding Rate | 1/3 |
| Spreading factor | 256 |
| Chip Rate | 3.84 Mchip/s |
| Packet Pay load Size | 100 bits |
| Coded Packet Size | 300 bits |
| Fading mean | −3 dB |
| Fading std deviation | 0, 1, 2 and 3 dB |
| Sliding Window Size | 3 × Coded Packet Size |
| Sliding Window Step | 1 × Coded Packet Size |
| Number IC iterations | 5 |

Figure 12A:
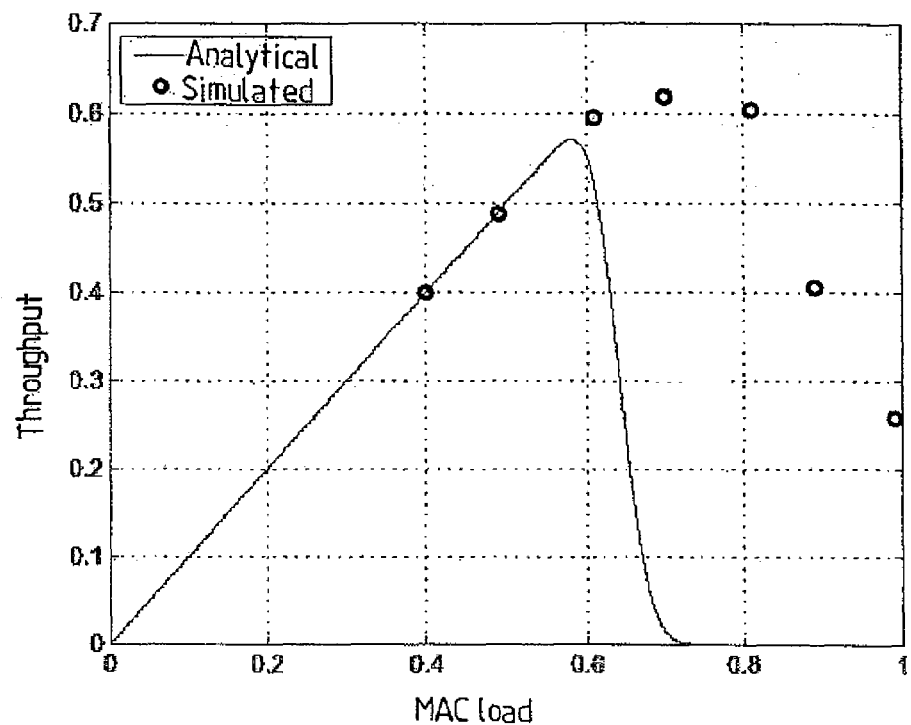
FIGS. 12a and 12b, a comparison of analytical and simulation results for the MAC performances of a Spread Aloha system without SIC.
Figure 12B:
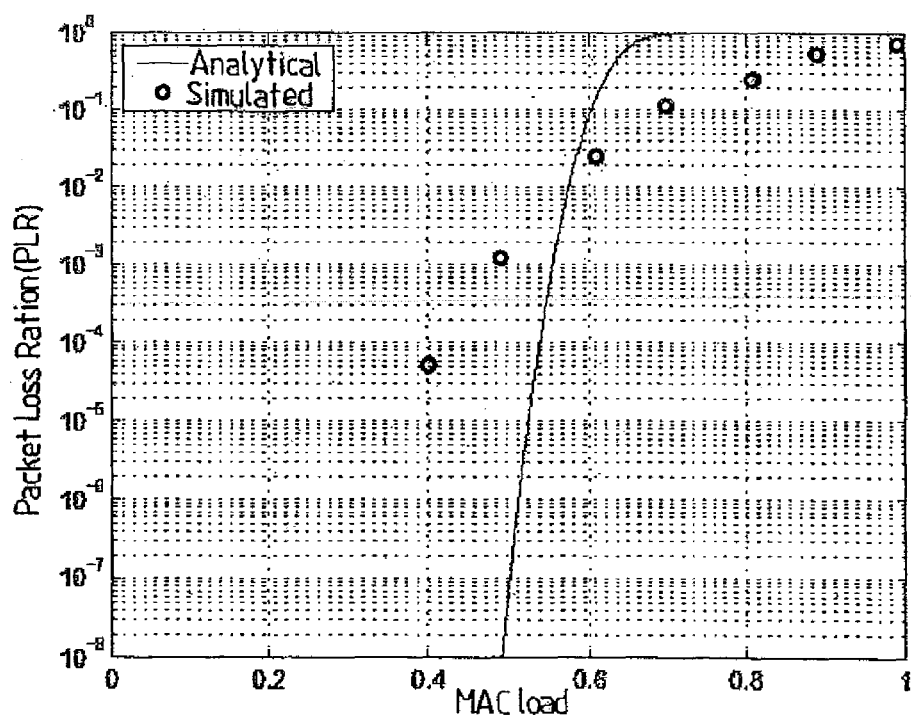

It can be assumed, with very good approximation, that the noise of the satellite-to-gateway feeder link is negligible First of all, the case of perfect power control (i.e. σ=0 dB) without SIC has been considered. FIGS. 12a and 12b show a comparison between the analytical results, discussed above, and the simulation results.

It can be seen that the differences between the analytical and the numerical model are quite significant, because the analytical model assumes a binary behavior of the decoder, (i.e. either below or above the $E_b/N_t$ threshold), while the simulation emulates a 3GPP decoder, and therefore the PLR is less steep. If, in the simulator, the 3GPP decoder is replaced by a threshold-based receiver, then both analytical and simulated results match perfectly.

Figure 13A:
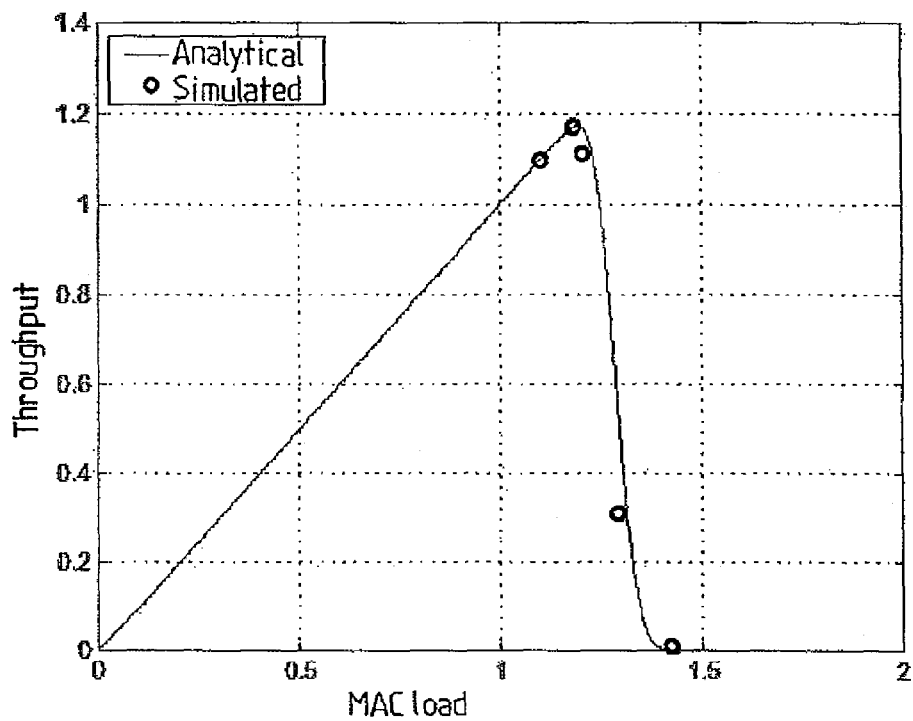
FIGS. 13a and 13b, a comparison of analytical an simulation results for the MAC performances of an Enhanced Spread Aloha system according to the invention (whit SIC)
Figure 13B:
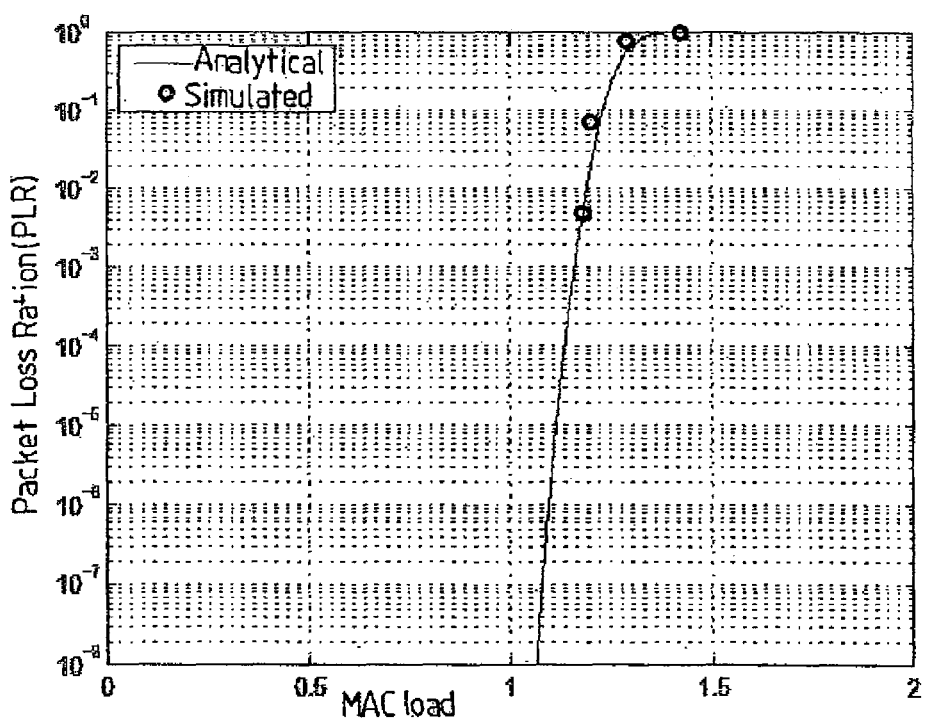

As shown on FIGS. 13a and 13b, in the case of the enhanced Spread Aloha (with SIC) both analytical and simulated results match perfectly. In this case it can be said that the iterative SIC processing has a binary behavior, i.e. the interference can be cancelled up to a certain level of system load. It is also important to stress that the assumption made above, according to which $\alpha_{MUD}=0.5$ is confirmed by the simulation results. Finally, it can also be seen that the PLR curve becomes very steep with the introduction of the iterative SIC processing as opposed to the SA PLR curve. Therefore, enhanced Spread Aloha allows achieving the peak throughput with a very low PLR.

Figure 14A:
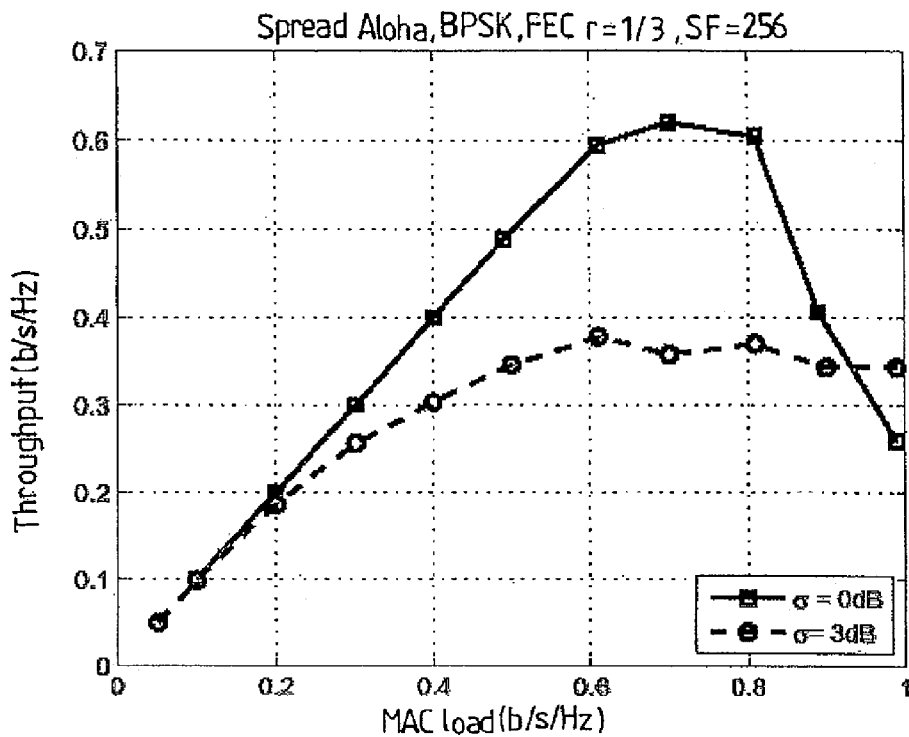
FIGS. 14a and 14b, two plots showing the incidence of imperfect power control on the MAC performances of a Spread Aloha system without SIC.
Figure 14B:
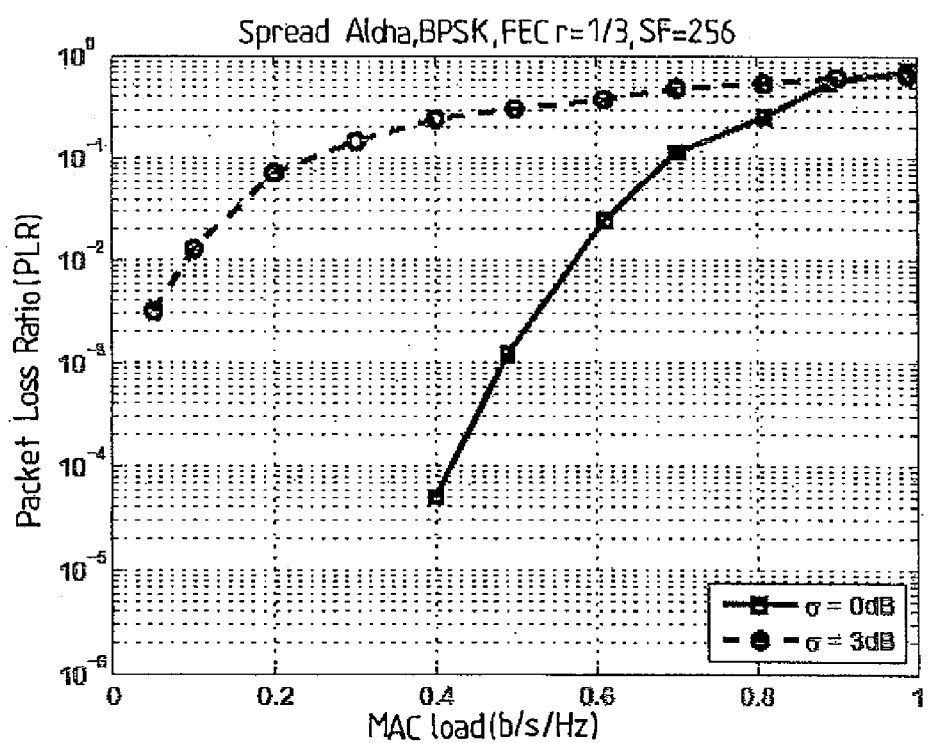
Figure 15A:
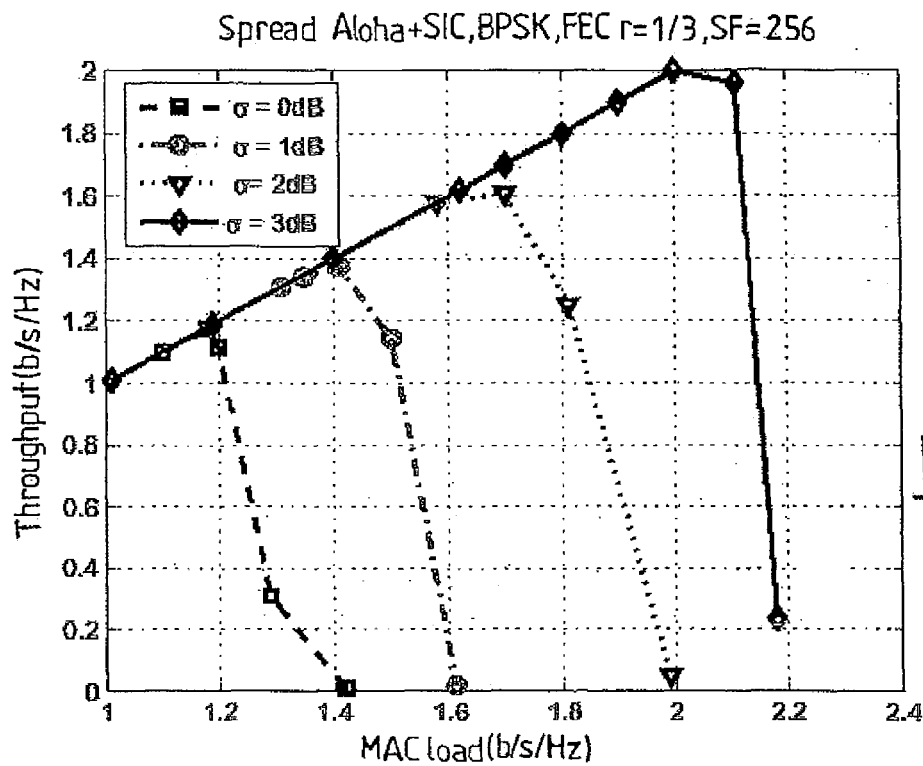
FIGS. 15a and 15b, two plots showing the incidence of imperfect power control on the MAC performances of an Enhanced Spread Aloha system according to the invention (whit SIC)
Figure 15B:
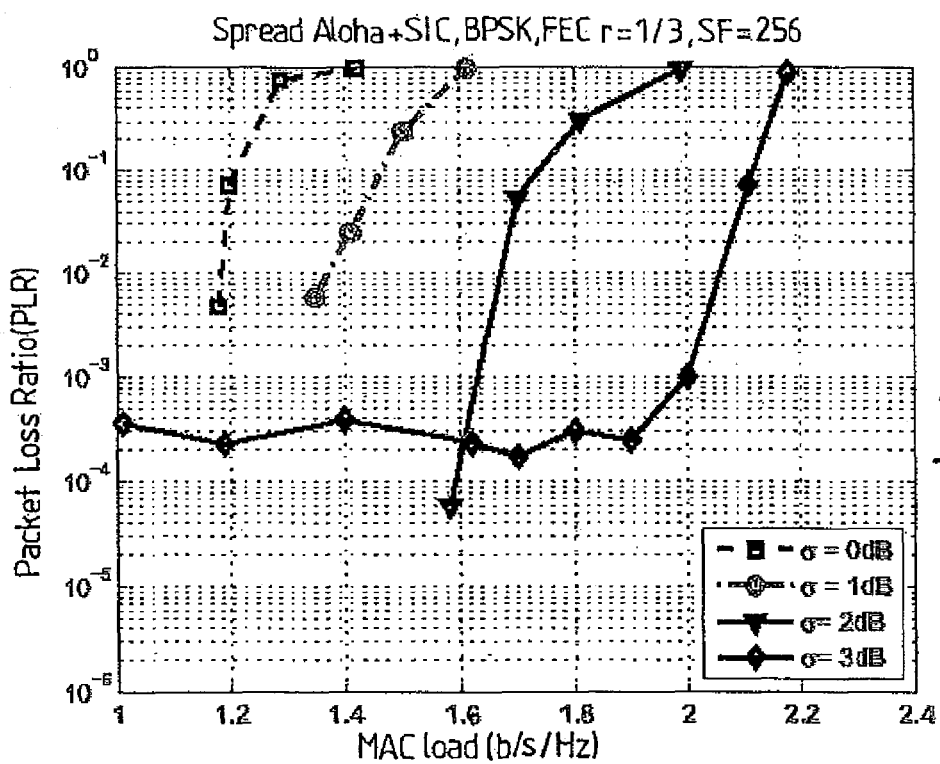

Another set of simulation has been performed in order to analyze the impact of imperfect power control on the system performances. FIGS. 14a, 14b shows the results of these simulation for the case of a Spread-Aloha system without SIC; FIGS. 15a, 15b refer to an Enhanced Spread Aloha system according to the invention.

It can be seen that, in the case of Spread Aloha, there is a significant degradation of the performance with the introduction of imperfect power control, due e.g. to fading with a standard deviation of the order of 3 dB. On the contrary, the enhanced Spread Aloha scheme is very robust to power unbalance and actually benefits from it. The maximum achievable throughput goes from 1.2 b/s/Hz for the case of σ=0 dB up to 2 b/s/Hz for the case of σ=3 dB. It is also important to note that for the case of σ=3 dB a floor for the PLR appears. Using the previously derived analytical equation for computing the packet error floor probability $P_{floor}$ one gets for μ=−3 dB, σ=3 dB and $[E_b/N_0]_{LOS}$=13.7 dB a probability of $2.7 \cdot 10^{-4}$ against a simulation result of $3 \cdot 10^{-4}$ in FIG. 15-b. This is due to the fact that with these power variations a number of packets will be below the thermal noise and there is no possibility to recover them unless the Satellite Antenna Carrier to Thermal Noise Ratio C/N received at the satellite is improved. This confirms the goodness of the analytical approach previously derived to compute the LOS link margin for obtaining a PLR floor.

Figure 16:
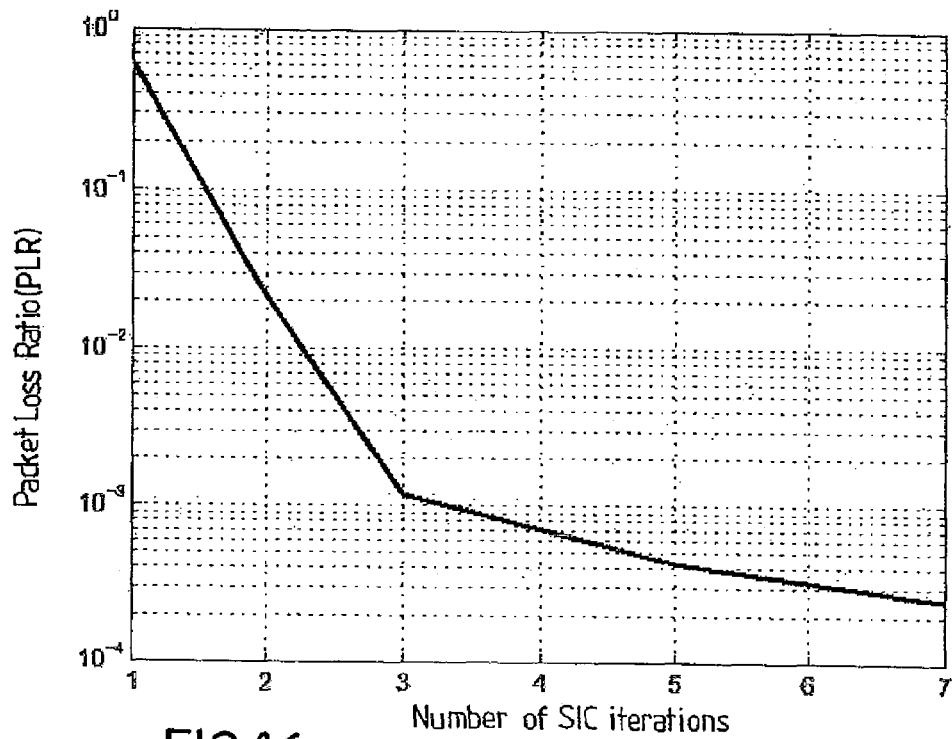
FIG. 16, a plot representing the dependence of PLR on the number of SIC iterations in an Enhanced Spread Aloha system according to the invention.

In addition, a sensitivity analysis of the key E-SSA SIC demodulator parameters has been performed. First it has been observed that increasing the number of SIC iterations from 5 to 7 can reduce the initial transient time required by the algorithm to converge. This is particularly useful when the system is going to operate close to the breakdown point in terms of MAC load so that despite the presence of a congestion control some peak of traffic can exceed the normal safe operating MAC level. Conversely, by decreasing the number of SIC iterations from 5 to 3, 2 or 1 the performance is degraded. The results of this analysis at high load (G=1.9 b/s/Hz) are shown in FIG. 16. The optimal value for the number of SIC iterations seems to be between 5 and 7 under heavy traffic conditions, while for moderate traffic 3 to 5 iterations shall be enough. Another aspect which has been investigated is the maximum window step size in the recursive SIC algorithm. Experimentally it has been found that the PLR performance remains practically unchanged up to a window step size of ⅓ of the window size (e.g. 1 packet step size for a 3 packets window). Further increasing the step size will cause noticeable performance degradation. Clearly increasing the step size also reduces the amount of processing required at the gateway side.

Finally, the performance impact of a larger FEC block size like the one envisaged for the real system in the order of 1000 bits cannot be simulated because of the prohibitive simulation time. However, it is expected that the larger FEC block size and the possible use of more efficient Turbo FEC schemes like the 3GPP2 one adopted by DVB-SH, should lead to an increased maximum MAC throughput. This conjecture is justified by observing that, as discussed above, the MAC throughput T(G) increases by reducing $[E_b/N_t]_{th}$. A preliminary case has been simulated at G=2.0 b/s/Hz with fading characterized by $\sigma_{fad}$=3 dB for two FEC block sizes: 100 and 500 information bits. In the first case, a PLR not lower than $10^{-3}$ has been achieved with 7 SIC iterations, while in the second case a PLR=$5 \cdot 10^{-4}$ with 5 SIC iterations.

As it can be seen, further increasing the FEC block size improves the performance of the E-SSA scheme.

It can be concluded that the proposed enhanced Spread Aloha scheme, adapts very well to the proposed scenario, yielding a very good spectral efficiency, a very steep PLR and a high robustness against imperfect power control.

The simulation and analysis results discussed above show that channel load is an important parameter for determining the performances of the communication system. In particular, a channel surcharge leads to a steep degradation of throughput and PLR. As a consequence, a form of transmission control should preferably be implemented.

According to a particular embodiment of the invention, E-SSA implements a simple yet robust transmission control algorithm which allows operating the system at near-optimum conditions in terms of power unbalance and channel load. This algorithm is particularly well suited to a system wherein a great number of users transmits short messages to a gateway with low duty cycle: it minimizes signaling and overhead, avoid login to the network at each time a packet has to be transmitted, does not require tight synchronization or closed-loop power control and can be implemented at low cost in mobile user terminals.

The idea at the basis of this method (called SDUPTC: SNIR-Driven Uplink Packet Transmission Control) is simple: user terminals only transmit when the downlink signal quality is good i.e. the signal strength or better signal-to-noise plus interference ratio (SNIR) is within a certain window representative of line of sight conditions (LOS). If this is not the case the transmission is delayed until LOS conditions are verified. In the following for notation simplicity we will use SNR at the place of SNIR for the forward link. For this purpose SNR estimation techniques like the SNORE are available (C. E. Gilchriest, "Signal-to-Noise Monitoring", JPL Space programs Summary, No. 37-27, Vol. IV, pp. 169-176) and known to perform as the maximum likelihood estimator if operated in data-aided mode (D. R. Pauluzzi, and N. C. Beaulieu, "A Comparison of SNR Estimation Techniques for the AWGN channel", IEEE Trans. Comm., vol. 48, pp. 1681-1691, October 2000). The LOS SNR is adaptively estimated by the mobile terminal to avoid the need for expensive calibration of the user terminal. Use of an adaptively varying threshold is an important feature of the invention. For example, said threshold can be taken equal to an average of the N highest values of the signal-to-noise-and-interference ratios estimated within a predetermined sliding observation window, N being a predetermined integer, multiplied by a predetermined factor lower than one.

For certain applications, such as issuing distress beacons in the case of an accident, it is always possible to skip the packet transmission control scheme, send several times the same time critical message and perform a smart processing at the gateway, by combining the replicated messages signals, in order to recover the message even when in deep fading conditions.

A simple congestion control mechanism can also be carried out, based on the measurement at the gateway of the so called noise rise χ i.e. the average noise plus interference power spectral density level $N_0+I_0$ over the thermal noise PSD $N_0$ i.e.:

$$\chi = \frac{N_0 + I_0}{N_0}$$

According to a simple model, the multiple access channel interference power spectral density $I_0$ can be expressed as:

$$I_0 \simeq \overline{N}_{ST}^{act} \frac{P_{ST\text{-}msg}^{Rx}}{R_c}$$

where $\overline{N}_{ST}^{act}$ the average number of active user terminal (or, equivalently, satellite terminals) ST, $P_{st\text{-}msg}^{Rx}$ the individual ST power received at the gateway and Rc the chip rate.

A busy tone BT is transmitted by the gateway as a common signaling information to all terminals following the simple rule:

$$B_T = \begin{cases} 1 & \text{if } \chi > \chi_{max} \\ 0 & \text{otherwise} \end{cases}$$

The amount of allowed noise rise $\chi_{max}$ will be computed at the gateway station and used there to determine the busy tone status.

When transmission is not inhibited because of non-LOS conditions, terminals transmit their messages at a random instant within a transmission window. In case the busy tone BT reports congestion in the system, then terminals with messages to be transmitted in their queues will increase the transmission window with a certain probability $P_{up}$. In the case where the system is no longer signaling any congestion, the terminals with messages to transmit shall start reducing their transmission windows with a certain probability $P_{down}$. In this way, it is possible to delay the transmissions from the terminals in case of congestion in a fully distributed manner. The probability to increase or decrease the transmission window shall follow an exponential binary distribution. In case of congestion, the larger the transmission window is for one terminal, the lower $P_{up}$ gets. In the opposite way, in case of no congestion the larger the transmission window is for one terminal, the higher $P_{down}$ gets. The same scheme can also be used to prioritize messages in case of congestion, e.g. in case of high priority messages the transmission window can scaled down by a factor which is inversely proportional to the priority of the message.

Figure 17A:
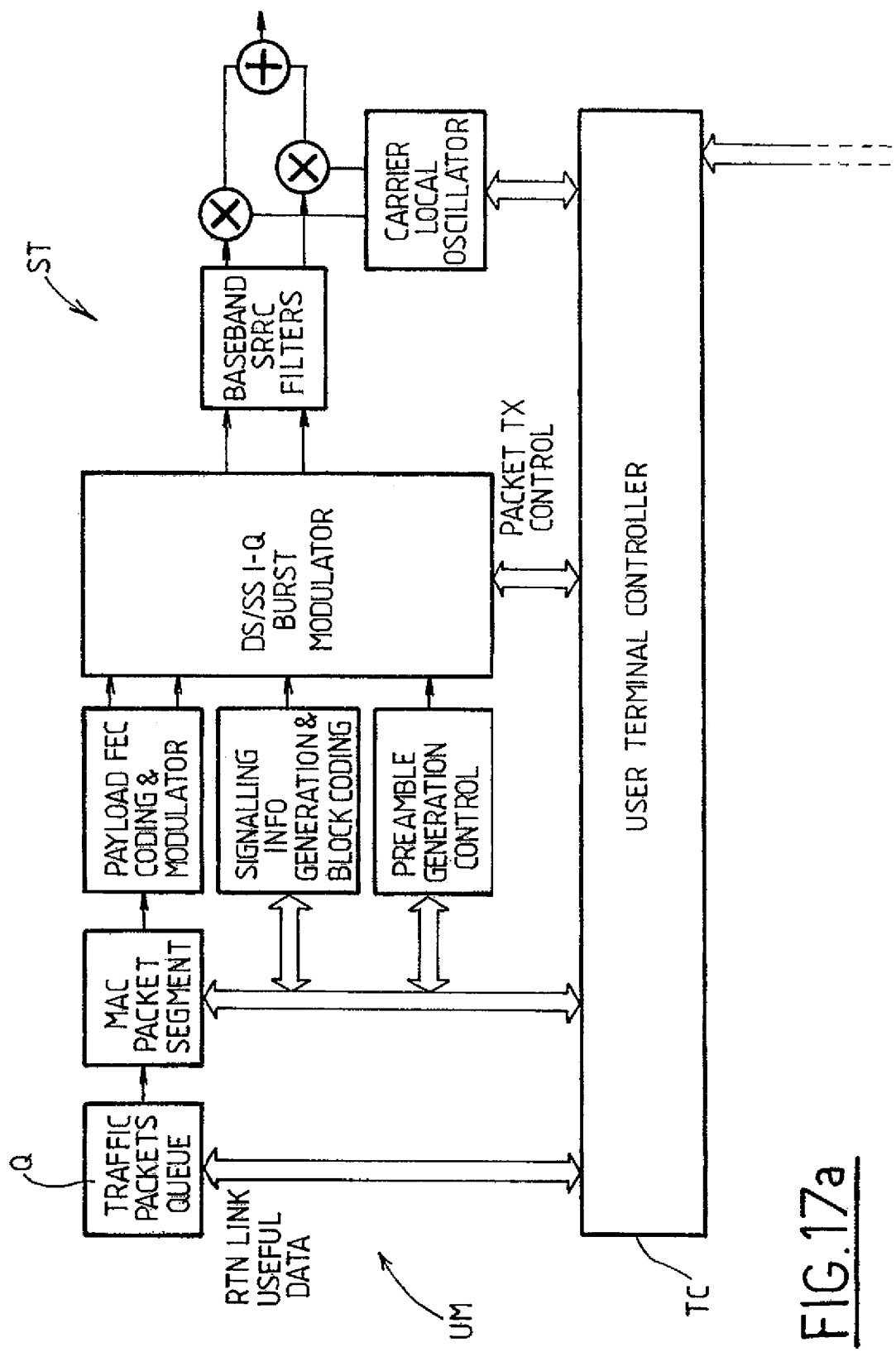
FIG. 17, a block diagram of a user terminal.
Figure 17B:
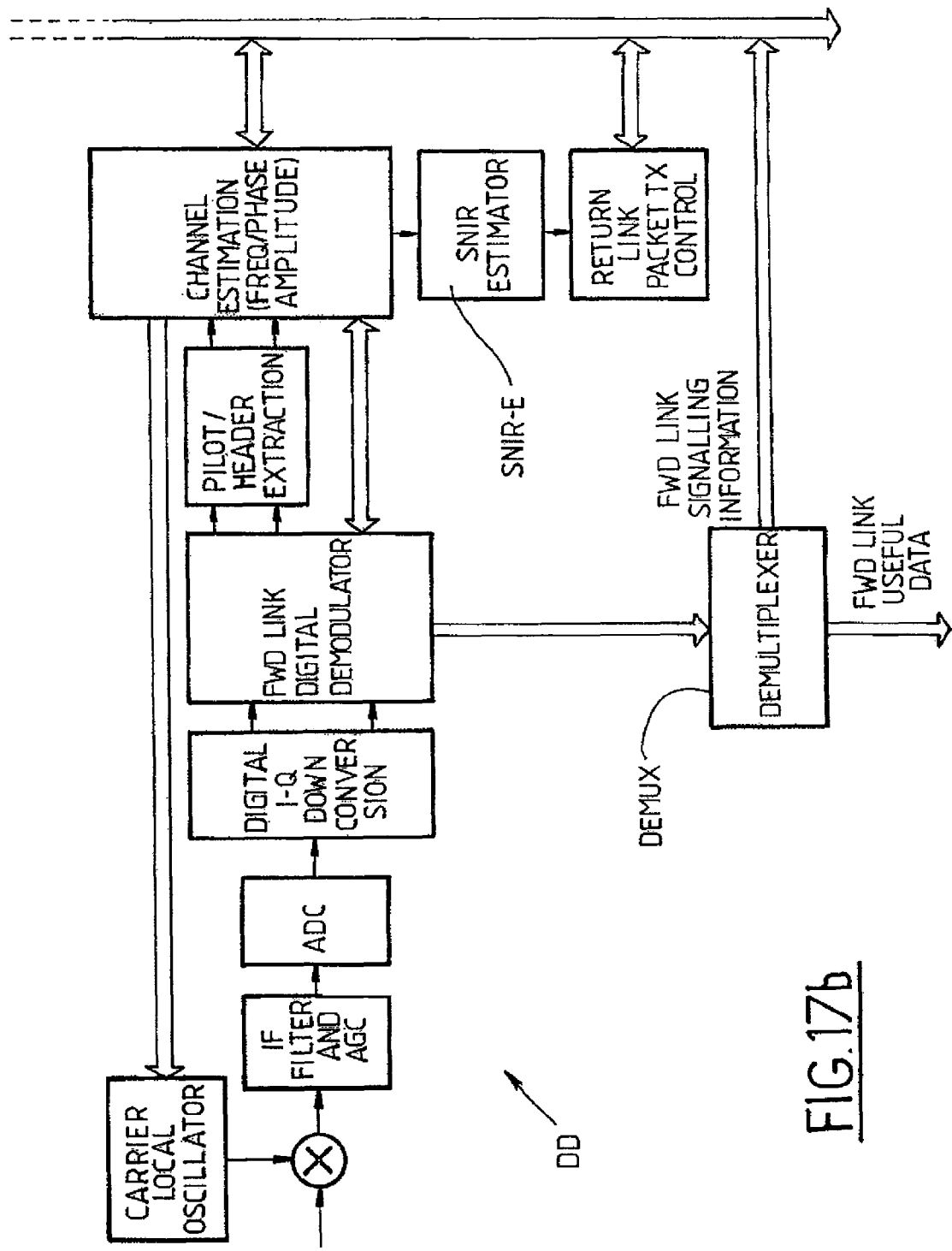

FIG. 17 shows a block diagram of a E-SSA user terminal ST. Such a device is comprised of two main parts: a downlink demodulator DD and an uplink modulator UM.

The downlink demodulator continuously performs SNIR estimation based on the downlink pilots (estimator bloc SNIR-E), it decodes the information data bits (demultiplexer DEMUX) and it extracts the signaling bits, carrying busy tone information as well as received packets acknowledgment.

The return link packet transmission controller TC takes into account this information as well as the input traffic queue and the minimum SNIR threshold to collects input messages (packets) in a queue Q. When said queue reaches a minimum level of filling, or when the elapsed time since packet reception has exceeded a predefined timeout, a packet transmission request is triggered by the terminal. The information packets are then segmented into MAC packets, then coded and assembled in a direct sequence spread-spectrum physical layer burst with the ancillary preamble and signaling fields. Then, subject to the packet transmit control on status, the burst is transmitted at RF with constant transmit power.

It should be remarked that, even if transmission from the mobile user terminal is performed at constant power, the received power at the gateway fluctuates because of:
- uncertainty/allowance in the received SNIR for return link packet transmission decision;
- difference in the terminal antenna EIRP (e.g. different antenna gain due to terminal orientation or satellite elevation, dispersion in the value of the effective RF power at the antenna input);
- return link shadowing/fading amplitude (no power control assumed even open loop); and
- different satellite antenna gain relative to the terminals position.

By observing FIG. 15-$a$ and FIG. 15-$b$ and the following table V, it can be seen that there is a strong dependency of the MAC throughput achieved as a function of the packet lognormal power standard deviation.

TABLE V

|  | σ = 0 dB | σ = 1 dB | σ = 2 dB | σ = 3 dB |
| --- | --- | --- | --- | --- |
| MAC Throughput @PLR = 1·10⁻³ (b/s/Hz) | 1.1 | 1.3 | 1.6 | 2.0 |

Table V shows that for the target PLR=1·10⁻³, the enhanced spread Aloha throughput grows with σ (which is the contrary of conventional Spread Aloha). Beyond σ=3 dB the throughput starts to mildly degrade and the PLR floor rises due to insufficient link margin as discussed before (see also FIG. 8). For this reason it is not recommended to operate with σ>3 dB unless there is no way to limit power unbalance standard deviation and the system allows to have enough link margin to make the PLR floor acceptable. Through the transmission control algorithm described later, it is possible to guarantee that the received packet power standard deviation approaches the optimum value described above (e.g. σ=3 dB). In case of a fixed scenario (like a fixed communication or a mobile with limited fading/shadowing) it may be of interest to introduce intentional power variations on the terminal side in order to generate the desired power fluctuations (e.g. σ=3 dB) at the gateway and optimize the Enhanced Spread Aloha throughput performance. This can be done by randomly varying the transmit power for each packet transmitted by each terminal according to a lognormal or ad-hoc distribution law. The random variable used to modify the terminal packet power shall be generated by a different seed to guarantee the random variable independence. The selected packet power standard deviation σ should ensure that the link margin is appropriate i.e. the PLR floor computed as described before is below the target MAC PLR.

The SDUTPC algorithm will now be discussed in detail, assuming the use of a DVB-SHB (TDM) waveform (see ETSI EN 302 583 V1.1.0 (2008-01) European Standard (Telecommunications series) Digital Video Broadcasting (DVB): Framing structure, channel coding and modulation for Satellite Services to Handheld devices (SH) below 3 GHz).

The downlink DVB-SH signal is used to perform a SNIR estimate which is then exploited to decide when the downlink channel conditions are good enough to transmit queued packets in the return link.

In particular, in the case of a DVB-SHB (TDM) waveform, the pilot-aided SNIR is provided every TDM slot. According to the standard, two fields of $N_p$=80 symbols each are available in each payload slot of $N_{slot}$=2176 symbols. The data-aided (pilot-aided) version of the SNORE algorithm (C. E.

Gilchriest, "Signal-to-Noise Monitoring", JPL Space programs Summary, No. 37-27, Vol. IV, pp. 169-176) is proposed as it satisfies the following conditions:

SNIR estimate is largely not dependent on the AGC behavior;

Maximum likelihood estimator;

Relative simple yet robust algorithm.

The pilot SNIR can be generically expressed as SNIR=$P_S$/$P_{Nt}$, where $P_S$ represents the pilot sequence received power and $P_{Nt}$ represents all noise plus interference received power. Assuming that the residual carrier frequency and phase error has been already recovered, the useful signal power at time $t_k = N_p + kN_{slot}/2$ can be estimated as follows:

$$\hat{P}_S(t_k) = \left\{ \frac{1}{2N_p W} \sum_{l=0}^{W-1} \sum_{m=1+(k-l)N_{slot}/2}^{N_p+(k-l)N_{slot}/2} [r_p(m) d_p(m)] \right\}^2 + \left\{ \frac{1}{2N_p W} \sum_{l=0}^{W-1} \sum_{m=1+(k-l)N_{slot}/2}^{N_p+(k-l)N_{slot}/2} [r_q(m) d_q(m)] \right\}^2$$

where $r_p(m)$ and $r_q(m)$ correspond to the in phase and quadrature received pilot components, while $d_p(m)$ and $d_q(m)$ constitute the original pilot sequence. The integer $W \geq 1$ represents the number of pilot fields coherently averaged. The total received power, $P_R$, can be expressed as:

$$\hat{P}_R(t_k) = \frac{1}{2N_p W} \sum_{l=0}^{W-1} \sum_{m=1+(k-l)N_{slot}}^{N_p+(k-l)N_{slot}} \{r_p^2(m) + r_q^2(m)\}$$

The noise plus interference power estimate is then derived as:

$$\hat{P}_{Nt}(t_k) = \hat{P}_R(t_k) - \hat{P}_S(t_k), \quad (4)$$

and the estimate $\hat{SNR}(t_k)$ is given by:

$$\hat{SNR}(t_k) = \frac{\hat{P}_S[k]}{\hat{P}_{Nt}[k]}$$

To estimate the LOS SNIR level one can store as LOS SNR the average of the best $N_b$ SNR estimates over a certain observation time window $T_{obs}$ which is sufficiently large:

$$\hat{SNR}_{LOS}(t) = \max\left\{ SNR_{min}^{ref}, \frac{1}{N_b} \sum_{l=1}^{N_b} \max_{t_k \in [t, t-T_{obs}]}^{N_b} \{\hat{SNR}(t_k)\} \right\}$$

where $SNR_{min}^{ref}$ is a pre-stored minimum allowed SNIR system value that avoids transmitting when the mobile terminal is experiencing too low SNIR during the observation period (i.e. car parked in a garage).

Assuming there is no busy tone indication in the downlink, packet transmission at time t=t* will then follow the following rule:

$$P_T(t^*) = \begin{cases} 1 & \text{if } [\hat{SNR}(t^*)]_{dB} \geq SNR_{th}(t^*) \\ 0 & \text{otherwise} \end{cases}$$

being PT the ST transmission flag and $SNR_{th}(t^*)$ the adaptive downlink SNIR threshold used to drive the uplink packet transmission given by:

$$SNR_{th}(t^*) = [\hat{SNR}_{LOS}(t^*)]_{dB} - [\Delta]_{dB}$$

where $\Delta$ is the allowed SNIR fluctuation in dB.

Figure 18:
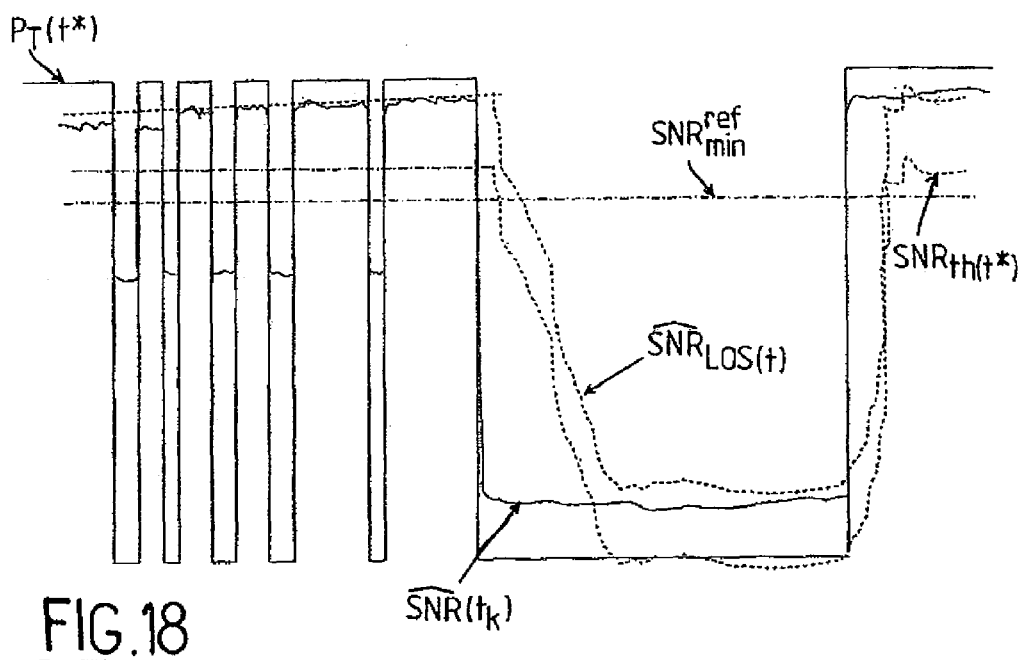
FIG. 18, a plot illustrating the adaptive determination of a SNIR threshold for uplink packet transmission control.

FIG. 18 represent a temporal plot of $\hat{SNR}(t_k)$, $\hat{SNR}_{LOS}(t)$, $SNR_{th}(t^*)$, $SNR_{min}^{ref}$ and $P_T(t^*)$.

To assess the algorithm performance the following probabilities are introduced:

$$p_{Tx}^{GA} = \frac{[N_{Tx}^p]^{GA}}{N_{slots}^{sim}/W}$$

$$p_{Tx}^{STDUPTC} = \frac{[N_{Tx}^p]^{STDUPTC}}{N_{slots}^{sim}/W}$$

$$p_{Tx-Ok}^{STDUPTC} = \frac{\sum_{i=1}^{N_{slots}^{sim}/W} \{packets_{Tx}^{STDUPTC}(i) = \text{ON} \mid packets_{Tx}^{GA}(i) = \text{ON}\}}{N_{slots}^{sim}/W}$$

$$p_{Tx-Miss}^{STDUPTC} = \frac{\sum_{i=1}^{N_{slots}^{sim}/W} \{packets_{Tx}^{STDUPTC}(i) = \text{OFF} \mid packets_{Tx}^{GA}(i) = \text{ON}\}}{N_{slots}^{sim}/W}$$

$$p_{Tx-Exc}^{STDUPTC} = \frac{\sum_{i=1}^{N_{slots}^{sim}/W} \{packets_{Tx}^{STDUPTC}(i) = \text{ON} \mid packets_{Tx}^{GA}(i) = \text{OFF}\}}{N_{slots}^{sim}/W}$$

where $p^{GA}_{Tx}$ corresponds to the probability of packet transmission for a gene-aided algorithm, $p^{STDUPTC}_{Tx}$ corresponds to the probability of packet transmission for the SDUPTC algorithm, $p^{STDUPTC}_{Tx-Ok}$ corresponds to the probability of correct (as gene-aided algorithm) packet transmission for the SDUPTC algorithm, $p^{STDUPTC}_{Tx-Exc}$ corresponds to the probability of missed (compared to gene-aided algorithm) packet transmission for the SDUPTC algorithm and $p^{STDUPTC}_{Tx-Exc}$ corresponds to the probability of extra (compared to gene-aided algorithm) packet transmission for the SDUPTC algorithm. The proposed simple SDUPTC algorithm is intended to limit the power unbalance among the packets received at the gateway side thus allowing a good MAC channel performance.

The SDUPTC transmission control algorithm and a user terminal implementing the same (see e.g. FIG. 17) can also be used independently from the method of receiving data packets which constitutes the main subject of the present Application, and in association with any other suitable data packet receiving technique. Indeed, the receiving and transmitting methods and apparatuses which have been described can be considered as separate inventions; however, it is particularly advantageous to combine them in a same communication system due to their synergetic operation.

To assess the performance of the proposed scheme a simplified DVB-SHB physical layer compliant simulator has been developed. The simulator is composed of a DVB-SHB modulator inclusive of pilot insertion, mobile fading channel, TDM demodulator inclusive of phase estimation, SNIR estimator and decision logic for the return link packet transmission.

The channel simulator is in line with the 3-state LMS Markov model from Fontan et al.:

Perez-Fontan, F., Vazquez-Castro M, Enjamio Cabado, C., Pita Garcia, J. and Kubista, E., "Statistical Modelling of the LMS Channel", IEEE Trans. on Vehic. Techn., Vol. 50, No. 6, November 2001; and Perez-Fontan, F., Vazquez-Castro M, S. Buonomo, Poiares-Baptista J. P., Arbesser-Rastburg B., "S-band LMS channel behavior for different environments, degrees of shadowing and elevation angles", IEEE Trans. On Broadcasting, Vol. 44, No. 1, March 1998, pp. 40-75.

To ease the system analysis the channel simulator is used on a per state basis, i.e. the Markov chain transitions have been blocked. The three States considered in this work represent the following shadowing conditions:

State 1: line-of-sight (LOS) events;
State 2: moderate shadowing events;
State 3: deep shadowing events.

It appears from the simulation results of table VI that state 1 is present for 40-50% of the time and it is where packet transmission will likely occur. The demodulator phase estimation algorithm adopted is the one described in the Appendix A of the DVB-SH implementation guidelines. For the $\hat{SNR}_{LOS}$ calculation, a reference value $SNR^{ref}_{min}$ obtained by simulations in the same mobile environment has been used.

TABLE VI

| Environment type | % Time State 1 | % Time State 2 | % Time State 3 |
|---|---|---|---|
| Open area (OPE) | 50 | 37.5 | 12.5 |
| Suburban area (SUB) | 45.4 | 45.4 | 9.2 |
| Intermediate tree shadowing area (ITS) | 39.3 | 35.7 | 25.9 |

To assess the impact of the return link different fading amplitude the following approximated approach has been followed:

The lognormal shadowing is assumed fully correlated between the forward and the return link;
The Rician fading is assumed to be fully uncorrelated between the forward and the return link.

The above assumptions are considered accurate enough for assessing the power errors experienced at the gateway input because of the forward/return link fading uncorrelation.

A number of tests and parameters optimizations have been performed to achieve good performance of the proposed return packet transmission control scheme over a variety of mobile environments (Open=OPE, Suburban=SUB, Intermediate Tree Shadowing=ITS) and different mobile speeds adopted (70 and 170 Kmph). In the following the simulated results for the different LMS channel mobile environments are reported for each of the three possible states.

As expected, in open environment at 170 kmph the transmission of packets is allowed for the vast majority of time when the channel is in state 1.

In state 2, a reduction in the number of transmitted packets is observed because of the wider signal fluctuation. Finally for state 3 of the LMS open channel, the reduction of transmitted packets is more marked although not so strong as for the SUB and ITS channels.

The power fluctuations statistics at mobile terminal transmission level and satellite antenna input level in open environment are summarized in Table VII below, where Tx means transmit and RTN means return. It can be remarked that the proposed algorithm performs pretty well compared to the gene-aided one. The transmission power fluctuations standard deviation does not exceed 0.6 dB with no return link fading/shadowing and 0.9 dB with return link fading/shadowing.

TABLE VII

| Parameter | State 1 | State 2 | State 3 | Unit/Symbol |
|---|---|---|---|---|
| Tx slots allowed [gene-aided] | 96.1 | 59.6 | 4.5 | %, $p_{Tx}^{GA}$ |
| Tx slots allowed [proposed algorithm] | 94.8 | 62.7 | 7.4 | %, $p_{Tx}^{STDUPTC}$ |
| Tx slots with correct decision | 95.8 | 81.9 | 94.8 | %, $p_{Tx-Ok}^{STDUPTC}$ |
| Tx slots with incorrect no Tx decision | 2.8 | 7.6 | 1.2 | %, $p_{Tx-Miss}^{STDUPTC}$ |
| Tx slots with incorrect Tx decision | 1.4 | 10.6 | 4.1 | %, $p_{Tx-Exc}^{STDUPTC}$ |
| Tx power standard dev without RTN fad | 0.6 | 0.5 | 0.3 | dB |
| Tx power standard dev with RTN fad | 0.9 | 0.9 | 0.8 | dB |

In a suburban environment at 70 kmph, the transmission of packets is allowed for only a limited percentage of time due to link obstructions, even for state 1. In state 2, because of the higher shadowing occurring, a major reduction in the number of transmitted packets is observed. Finally, for state 3 of the LMS suburban channel, the link is basically obstructed so there is no chance to successfully transmit packets. The algorithm is able to cope with this environment even at high mobile speed. The power fluctuations statistics at mobile terminal transmission level and satellite antenna input level are summarized in Table VIII. It can be remarked that the proposed algorithm performs pretty well compared to the gene-aided one. The transmission power fluctuations standard deviation does not exceed 0.8 dB with no return link fading/shadowing and 1.9 dB with return link fading/shadowing (state 1). The state 2 and 3 statistics for power error are based on a limited set of transmissions and are with low probability of occurrence thus not very significant.

TABLE VIII

| Parameter | State 1 Value | State 2 Value | State 3 Value | Unit |
|---|---|---|---|---|
| Tx slots allowed [gene-aided] | 18.7 | 0.0 | 0.0 | % |
| Tx slots allowed [proposed algorithm] | 24.0 | 0.15 | 0.0 | % |
| Tx slots with correct decision | 89.6 | 99.85 | 100.0 | % |
| Tx slots with incorrect no Tx decision | 2.6 | 0.0 | 0.0 | % |
| Tx slots with incorrect Tx decision | 7.8 | 0.2 | 0.0 | % |
| Tx power standard dev without RTN fad | 0.8 | N/A | N/A | dB |
| Tx power standard dev with RTN fad | 2.0 | N/A | N/A | dB |

Simulations show that the SNORE algorithm performs remarkably well even in the difficult intermediate tree shadowing environment, and at a high terminal speed (170 kmph).

As expected in this environment, the transmission of packets is allowed for only a certain percentage of time due to link obstructions, even when the channel is in its best state (1). In state 2 a major reduction in the number of transmitted packets is observed because of the higher shadowing level. Finally, for state 3 of the LMS intermediate tree shadowing, the link is basically obstructed so there is no chance to successfully transmit packets.

The power fluctuations statistics at mobile terminal transmission level and satellite antenna input level are summarized in Table IX. It can be remarked that the proposed algorithm performs pretty well compared to the gene-aided one. The transmission power fluctuations standard deviation does not exceed 0.8 dB with no return link fading/shadowing and 2.0 dB with return link fading/shadowing. The state 2 and 3 statistics for power error are based on a limited set of transmissions and are with low probability of occurrence thus not very significant.

TABLE IX

| Parameter | State 1 Value | State 2 Value | State 3 Value | Unit |
|---|---|---|---|---|
| Tx slots allowed [gene-aided] | 18.7 | 0.0 | 0.0 | % |
| Tx slots allowed [proposed algorithm] | 24.0 | 0.15 | 0.0 | % |
| Tx slots with correct decision | 89.6 | 99.85 | 100.0 | % |
| Tx slots with incorrect no Tx decision | 2.6 | 0.0 | 0.0 | % |
| Tx slots with incorrect Tx decision | 7.8 | 0.2 | 0.0 | % |
| Tx power standard dev without RTN fad | 0.8 | N/A | N/A | dB |
| Tx power standard dev with RTN fad | 2.0 | N/A | N/A | dB |

In conclusion, the invention provides a possible solution to efficiently cope with the S-band (but also Ka and Ku band) system interactivity requirements.

For the most challenging non-real-time interactive messaging system, the invention provides a solution based on Spread Aloha with packet-oriented, possibly iterative SIC processing using an innovative "sliding window" algorithm, as well as a simple yet efficient uplink packet transmission control method.

Theoretical analysis and simulation have shown that the proposed random access MAC scheme provides truly remarkable performance in terms of throughput, packet loss ratio and resilience to received signal power unbalance. Power unbalance enhances the SIC iterative processing performances, instead of degrading them, allowing achieving a MAC throughput in the order of 2 b/s/Hz over a satellite mobile channel which is about 40 times higher than conventional SA.

The proposed approach appears well suited for a software defined radio (SDR) gateway implementation with recursive processing of the stored baseband signal samples. This SDR approach will allow a low-risk, low-cost implementation of the gateway demodulator with large scalability capabilities.

The invention claimed is:

1. A method of receiving data packets asynchronously transmitted by a plurality of user terminals using an unslotted spread-spectrum medium access protocol, each data packet being constituted by a contiguous sequence of bits comprising at least a preamble and a payload, the method including a step of successive interference cancellation comprising:
    f) storing received signal samples in a processing memory;
    g) performing packet identification on all the signals stored in said processing memory within a sliding processing window;
    h) selecting one among the identified packets, decoding it and, if decoding is successful, cancelling the interferences of said packet with the other received data inside the sliding processing window;
    i) repeating step c) for all or part of the packets identified at step b); and
    j) shifting the processing window by a shifting step which is shorter than the overall length of said processing window.

2. A method according to claim 1, wherein substeps b), c) and d) are iterated a predetermined number of times, greater than one.

3. A method according to claim 2, wherein substeps b), c) and d) are iterated the maximum number of times allowing real-time processing of the received data.

4. A method according to claim 1, wherein substep c) comprises selecting the identified packet having the higher signal-to-noise-and-interference ratio.

5. A method according to claim 1, wherein substep b) comprises performing packet identification by detecting known packet preambles.

6. A method according to claim 5, wherein substep c) comprises:
    c1) performing data-aided channel estimation for the selected packet over the preamble;
    c2) performing error-correction decoding of the selected packet;

c3) performing enhanced data-aided channel estimation over the whole packet;

c4) reconstructing said packet at baseband and performing interference cancellation.

7. A method according to claim 6, wherein enhanced data-aided channel estimation, packet reconstruction and interference cancellation are performed only if error-correction decoding has been successful.

8. A method according to claim 1, wherein the length of said sliding processing window (PW) is at least equal to two, and preferably three times the length of a physical layer packet emitted by said user terminals.

9. A method according to claim 1, wherein the length of said shifting step is between one third and one half of the length of said sliding processing window.

10. A gateway receiver (GWR) for receiving data packets asynchronously transmitted by a plurality of user terminals (ST) using a spread-spectrum medium access protocol, comprising:
a front-end unit (FEU), for demodulating and digitizing the received signals; and
a data processing unit (DPU) for performing spread-spectrum demodulation, decoding and interference cancellation;
wherein said data processing unit is adapted for carrying out an interference cancellation method according to claim 1.

11. A method of performing bi-directional asynchronous communication between a gateway receiver and a plurality of user terminals using an unslotted spread-spectrum medium access protocol, comprising a step of transmitting data packet from at least one said user terminal and a step of receiving transmitted data packet at said gateway receiver, wherein:
the step of receiving transmitted data packets is performed according to claim 1; and
the step of a transmitting data packet includes sub-step of controlling asynchronous packet transmission, comprising:
estimating a parameter ($\hat{SNR}(t_k)$) indicative of the quality of information transmission through the communication channel, on the basis of data emitted by said gateway and received by said user terminal through said channel; and
inhibiting data transmission by said user terminal whenever said estimated parameter is indicative of an insufficient transmission quality, according to an adaptively varying criterion.

12. A method according to claim 11, wherein said parameter indicative of the quality of information transmission through the communication channel is a signal-to-noise-and-interference ratio ($\hat{SNR}(t_k)$); and wherein data transmission is inhibited when the estimated signal-to-noise-and-interference ratio is lower than an adaptively varying threshold ($SNR_{th}(t^*)$).

13. A method according to claim 12, wherein said adaptively varying threshold ($SNR_{th}(t^*)$) is equal to an average of the N highest values of the signal-to-noise-and-interference ratios estimated within a predetermined sliding observation window, N being a predetermined integer, multiplied by a predetermined factor lower than one.

14. A method according to claim 12, wherein said signal-to-noise-and-interference ratio is estimated from a known pilot sequence of a received data packet.

15. A method according to claim 11 comprising:
when transmission is not inhibited, and if at least a data packet is ready for transmission, transmitting said data packet at a random time within a time window of a predetermined length.

16. A method according to claim 15, further comprising:
upon reception at the user terminal of a signal, emitted by said gateway and indicative of a channel congestion situation, increasing the length of said time window by a predetermined amount with a first probability, and upon lack of reception of said signal for a predetermined time, decreasing the length of said time window with a second probability.

17. A method according to claim 16, wherein said first probability decreases and said second probability increases as the length of said time window increases.

18. A method according to claim 16, wherein the length of said time window is scaled according to a priority level of the data packet to be transmitted.

19. A method according to claim 11, further comprising randomly varying the transmit power for each packet, independently from other user terminals communicating with a same gateway, according to a probability distribution adapted for optimizing a received power distribution at said gateway.

20. A communication system comprising a plurality of mobile user terminal (ST) communicating with at least one gateway through a satellite channel using an asynchronous spread-spectrum medium access protocol without closed-loop power control, characterized in that:
said user terminals comprise transmission control means adapted for carrying out a sub-step of controlling asynchronous packet according to claim 11; and
said or each gateway comprises a gateway receiver (GWR) for receiving data packets asynchronously transmitted by a plurality of user terminals (ST) using a spread-spectrum medium access protocol, comprising:
a front-end unit (FEU), for demodulating and digitizing the received signals; and
a data processing unit (DPU) for performing spread-spectrum demodulation, decoding and interference cancellation.

21. A communication system according to claim 20, wherein said gateway further comprises means for detecting a congestion situation of the satellite channel, and emitting a congestion signal accordingly; and wherein said user terminals comprises transmission control means operable upon reception of a congestion signal emitted by said gateway, for increasing the length of said time window by a predetermined amount with a first probability, and upon lack of reception of said congestion signal for a predetermined time, for decreasing the length of said time window with a second probability*.

22. A communication system according to claim 20, wherein the link margin for said user terminals is sized in order to achieve a desired floor Packet Error Rate (PER).

* * * * *

UNITED STATES PATENT AND TRADEMARK OFFICE
CERTIFICATE OF CORRECTION

PATENT NO. : 7,990,874 B2  
APPLICATION NO. : 12/547092  
DATED : August 2, 2011  
INVENTOR(S) : del Rio Herrero et al.

It is certified that error appears in the above-identified patent and that said Letters Patent is hereby corrected as shown below:

Column 34,

Lines 18-49, claim 1 should read:

--1. A method of receiving data packets asynchronously transmitted by a plurality of user terminals using an unslotted spread-spectrum medium access protocol, each data packet being constituted by a contiguous sequence of bits comprising at least a preamble and a payload, the method including a step of successive interference cancellation comprising:
   a) storing received signal samples in a processing memory;
   b) performing packet identification on all the signals stored in said processing memory within a sliding processing window;
   c) selecting one among the identified packets, decoding it and, if decoding is successful, cancelling the interferences of said packet with the other received data inside the sliding processing window;
   d) repeating step c) for all or part of the packets identified at step b); and
   e) shifting the processing window by a shifting step which is shorter than the overall length of said processing window.--.

Signed and Sealed this  
Tenth Day of April, 2012

David J. Kappos  
*Director of the United States Patent and Trademark Office*